United States Patent
Takase et al.

(10) Patent No.: US 10,597,071 B2
(45) Date of Patent: Mar. 24, 2020

(54) ELECTRIC POWER STEERING APPARATUS

(71) Applicant: NSK Ltd., Tokyo (JP)

(72) Inventors: Hiroaki Takase, Tokyo (JP); Ryo Minaki, Tokyo (JP); Hideki Sawada, Tokyo (JP); Takayoshi Sugawara, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/320,734

(22) PCT Filed: Aug. 16, 2017

(86) PCT No.: PCT/JP2017/029445
§ 371 (c)(1),
(2) Date: Jan. 25, 2019

(87) PCT Pub. No.: WO2018/037981
PCT Pub. Date: Mar. 1, 2018

(65) Prior Publication Data
US 2019/0344824 A1    Nov. 14, 2019

(30) Foreign Application Priority Data
Aug. 24, 2016   (JP) ................................ 2016-163715

(51) Int. Cl.
*B62D 6/00* (2006.01)
*B62D 5/04* (2006.01)
(Continued)

(52) U.S. Cl.
CPC ............. *B62D 6/00* (2013.01); *B62D 5/0463* (2013.01); *H02M 1/38* (2013.01);
(Continued)

(58) Field of Classification Search
CPC ......... B62D 6/00; B62D 5/0463; H02P 21/09; H02P 21/22; H02P 27/12; H02M 1/38; H02M 7/53871; H02M 2001/385
(Continued)

(56) References Cited

U.S. PATENT DOCUMENTS

2015/0185095 A1   7/2015  Wu et al.
2015/0251692 A1*  9/2015  Mikamo .............. B62D 5/0472
                                                      701/42

FOREIGN PATENT DOCUMENTS

JP     2004-201414 A    7/2004
JP     2006-081260 A    3/2006
(Continued)

OTHER PUBLICATIONS

International Search Report of PCT/JP2017/029445 dated Nov. 21, 2017 [PCT/ISA/210].
(Continued)

*Primary Examiner* — Gertrude Arthur Jeanglaude
(74) *Attorney, Agent, or Firm* — Sughrue Mion, PLLC

(57) ABSTRACT

An electric power steering apparatus of vector control system that calculates steering assist command values of dq axes based on at least a steering torque, calculates dq-axes current command values from the steering assist command values, converts the dq-axes current command values into 3-phase duty command values, driving-controls a 3-phase brushless motor by an inverter of a PWM control, and applies an assist torque to a steering system of a vehicle, wherein the electric power steering apparatus has plural dead time compensating functions of which efficiencies to respectively perform a dead time compensation of the inverter are different each other, and performs the dead time compensation by switching from one of the plural dead time
(Continued)

compensating functions to an another dead time compensating function with a predetermined condition.

11 Claims, 19 Drawing Sheets

(51) Int. Cl.
    *H02P 21/09*     (2016.01)
    *H02P 27/12*     (2006.01)
    *H02M 1/38*     (2007.01)
    *H02M 7/5387*     (2007.01)
    *H02P 21/22*     (2016.01)

(52) U.S. Cl.
    CPC ........ *H02M 7/53871* (2013.01); *H02P 21/09* (2016.02); *H02P 21/22* (2016.02); *H02P 27/12* (2013.01); *H02M 2001/385* (2013.01)

(58) Field of Classification Search
    USPC .......................................................... 701/41
    See application file for complete search history.

(56) References Cited

FOREIGN PATENT DOCUMENTS

| | | | |
|---|---|---|---|
| JP | 2006-199140 | A | 8/2006 |
| JP | 2006320122 | A | 11/2006 |
| JP | 2007-045394 | A | 2/2007 |
| JP | 2007-091182 | A | 4/2007 |
| JP | 2007-253670 | A | 10/2007 |
| JP | 2010-228701 | A | 10/2010 |
| JP | 4681453 | B2 | 5/2011 |
| JP | 2012-011965 | A | 1/2012 |
| JP | 2015-171251 | A | 9/2015 |
| WO | 2012/169311 | A1 | 12/2012 |

OTHER PUBLICATIONS

Written Opinion of PCT/JP2017/029445 dated Nov. 21, 2017 [PCT/ISA/237].

* cited by examiner

PRIOR ART

PRIOR ART d-AXIS ANGLE DEAD TIME COMPENSATION-VALUE REFERENCE TABLE
(ELECTRIC ANGLE 0-359 [deg])

q-AXIS ANGLE DEAD TIME COMPENSATION-VALUE REFERENCE TABLE
(ELECTRIC ANGLE 0-359 [deg])

ELECTRIC POWER STEERING APPARATUS

CROSS REFERENCE TO RELATED APPLICATIONS

This application is a National Stage of International Application No. PCT/JP2017/029445, filed Aug. 16, 2017, claiming priority based on Japanese Patent Application No. 2016-163715, filed Aug. 24, 2016.

TECHNICAL FIELD

The present invention relates to an electric power steering apparatus that vector-controls a driving of a 3-phase brushless motor with a dq-axes rotational coordinate system, improves a steering performance and enables to assist-control with a smooth maneuver and without a steering sound, by performing a dead time compensation corresponding to a steering state by switching (condition-branching) plural dead time compensating functions (e.g. a dead time compensating function of an inverter based on a motor rotational angel (an electric angle) and a dead time compensating function of the inverter based on a current command value model).

BACKGROUND ART

An electric power steering apparatus (EPS) which provides a steering system of a vehicle with a steering assist torque (an assist torque) by a rotational torque of a motor, applies the steering assist torque to a steering shaft or a rack shaft by means of a transmission mechanism such as gears by using a driving force of the motor which is controlled by electric power supplied from an electric power supplying section. In order to accurately generate the steering assist torque, such a conventional electric power steering apparatus performs a feed-back control of a motor current. The feed-back control adjusts a voltage supplied to the motor so that a difference between a steering assist command value (a current command value) and a detected motor current value becomes small, and the adjustment of the voltage supplied to the motor is generally performed by an adjustment of duty command values of a pulse width modulation (PWM) control.

A general configuration of the conventional electric power steering apparatus will be described with reference to FIG. 1. As shown in FIG. 1, a column shaft (a steering shaft or a handle shaft) 2 connected to a handle (a steering wheel) 1 is connected to steered wheels 8L and 8R through reduction gears 3, universal joints 4a and 4b, a pinion-and-rack mechanism 5, and tie rods 6a and 6b, further via hub units 7a and 7b. In addition, the steering shaft 2 is provided with a steering angle sensor 14 for detecting a steering angle θ and a torque sensor 10 for detecting a steering torque Th of the handle 1, and a motor 20 for assisting the steering torque of the handle 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist command (a steering assist command) on the basis of the steering torque Th detected by the torque sensor 10 and a vehicle speed Vs detected by a vehicle speed sensor 12, and controls a current supplied to the motor 20 by means of a voltage control command value Vref obtained by performing a compensation or the like to the current command value.

As well, a steering angle sensor 14 is not indispensable and may not be provided. It is possible to obtain the steering angle θ from a rotational position sensor which is connected to the motor 20.

A controller area network (CAN) 40 to send/receive various information and signals on the vehicle is connected to the control unit 100, and it is also possible to receive the vehicle speed Vel from the CAN 40. Further, a Non-CAN 41 is also possible to connect to the control unit 30, and the Non-CAN 41 sends and receives a communication, analogue/digital signals, electric wave or the like except for the CAN 40.

The control unit 30 mainly comprises a CPU (Central Processing Unit) (including an MPU (Micro Processor Unit) and an MCU (Micro Controller Unit)), and general functions performed by programs within the CPU are, for example, shown in FIG. 2.

The control unit 30 will be described with reference to FIG. 2. As shown in FIG. 2, the steering torque Th detected by the torque sensor 10 and the vehicle speed Vs detected by the vehicle speed sensor 12 are inputted into a steering assist command value calculating section 31, and the steering assist command value calculating section 31 calculates a steering assist command value Iref1 based on the steering torque Th and the vehicle speed Vs with reference to an assist map or the like. The calculated steering assist command value Iref1 is added with a compensation signal CM for improving characteristics from a compensating section 34 at an adding section 32A. The steering assist command value Iref2 after addition is limited the maximum value thereof at a current limiting section 33. The current command value Irefm whose maximum current is limited is inputted into a subtracting section 32B, and the current command value Irefm is subtracted a motor current detected value Im at the subtracting section 32B.

A deviation ΔI (=Irefm−Im) which is a subtracted result at the subtracting section 32B is current-controlled with a proportional-integral (PI) and so on at a PI-control section 35, the current-controlled voltage control command value Vref is inputted into a PWM-control section 36 with a modulation signal (a triangular wave carrier) CF. Duty command values are calculated at the PI-control section 35, and the motor 20 is PWM-controlled by using a PWM signal being calculated duty command values via an inverter 37. The motor current value Im of the motor 20 is detected by a motor current detector 38 and is fed-back to the subtracting section 32B.

The compensating section 34 adds a detected or estimated self-aligning torque (SAT) 343 with an inertia compensation value 342 at an adding section 344, further adds a convergence control value 341 with the added value at an adding section 345, and performs a characteristic improvement by inputting the added result to the adding section 32A as the compensation signal CM.

Recently, a 3-phase brushless motor is mainly used as an actuator of the electric power steering apparatus, and since the electric power steering apparatus is automotive products, the operating temperature range is wide. From a view point of a fail-safe, a dead time of the inverter to drive the motor needs greater than that for general industrial purposes that home appliances (industrial equipment<EPS). Generally, since a switching device (e.g. a field-effect transistor (FET)) has a delay time when it is turned OFF, a direct current link is shorted when the switching devices of an upper-arm and a lower-arm are simultaneously turned ON or OFF. In order to prevent the above problem, a time (a dead time) that the switching devices of both arms are turned OFF, is set.

As a result, a current waveform is distorted, and a responsibility of the current control and a steering feeling go down. For example, in a state that the handle is near on-center of the steering, a discontinuous steering feeling and the like due to the torque ripple are occurred. Further, since a motor back-EMF (electromotive force) at a time of awhile speed steering or a high speed steering and an interference voltage among windings act for the current control as a disturbance, a steering follow-up performance and a steering feeling at a turning back maneuver go down.

A q-axis to control the torque being the coordinate axis of a rotor of the 3-phase brushless motor and a d-axis to control the magnetic field strength are independently set and has a relation that the d-axis and the q-axis is 90°. Thus, a vector control system to control the currents (the d-axis current command value and the q-axis current command value) corresponding to respective axes with the vector, is known.

FIG. 3 shows a configuration example in a case that a 3-phase brushless motor 100 is driving-controlled by the vector control system. Steering assist command values (Iref2 (idref, iqref$_f$)) of two axes based on the steering torque Th, the vehicle speed Vs and so on are calculated, a d-axis current command value id* and a q-axis current command value iq* whose maximum values are limited are respectively inputted into subtracting sections 131$d$ and 131$q$, and current deviations Δid* and Δiq* obtained at the subtracting sections 131$d$ and 131$q$ are respectively inputted into PI-control sections 120$d$ and 120$q$. Voltage command values vd and vq PI-controlled at the PI-control sections 120$d$ and 120$q$ are respectively inputted into a subtracting section 141$d$ and an adding section 141$q$, and voltages Δvd and Δvq obtained at the subtracting section 141$d$ and the adding section 141$q$ are inputted into a dq-axes/3-phase alternative current (AC) converting section 150. Voltage command values Vu*, Vv*, Vw* converted into 3-phases at the dq-axes/3-phase AC converting section 150 are inputted into a PWM-control section 160, and the motor 100 is driven with PWM-signals $U_{PWM}$, $V_{PWM}$, $W_{PWM}$ based on calculated 3-phase duty command values (Duty$_u$, Duty$_v$, Duty$_w$) via the inverter (inverter applying voltage VR) 161 comprised of abridge constitution of an upper-arm and a lower-arm as shown in FIG. 4. The upper-arm comprises of FETs Q1, Q3, Q5 serving as switching devices and the lower-arm comprises of FETs Q2, Q4, Q6.

The 3-phase motor currents iu, id, iw of the motor 100 are detected by current detectors 162, and the detected 3-phase motor currents iu, id, iw are inputted into a 3-phase AC/dq-axes converting section 130. Feedback currents id and iq of 2-phases converted at the 3-phase AC/dq-axes converting section 130 are respectively inputted into subtracting sections 131$d$ and 131$q$, and further inputted into a d-q non-interference control section 140. Further, a rotational sensor or the like is attached to the motor 100, and a motor rotational angle θ and a motor rotational number (a rotational velocity) ω are outputted from an angle detecting section 110 to process the sensor signal. The motor rotational angle θ is inputted into the dq-axes/3-phase AC converting section 150 and the 3-phase AC/dq-axes converting section 130, and the motor rotational number ω is inputted into the d-q non-interference control section 140. Voltage vd1* and vq1* of 2-phases from the d-q non-interference control section 140 are respectively inputted into the subtracting section 141$d$ and the adding section 141$q$, and the voltages Δvd and Δvq are calculated at the subtracting section 141$d$ and the adding section 141$q$.

The electric power steering apparatus of the vector control system described above is an apparatus to assist a steering of a driver, and a sound and a vibration of the motor, a torque ripple and the like are transmitted to the driver as a force sense via the steering wheel. The FETs are generally used as power devices to drive the inverter, and the current is applied to the motor. In a case that the 3-phase motor is used, FETs, which are connected in series for respective phases, of the upper-arm and the lower-arm are used as shown in FIG. 4. Although the FETs of the upper-arm and the lower-arm are alternatively turned ON and OFF, the FET does not simultaneously turn ON and OFF in accordance with a gate signal since the FET is not an ideal switching device. Therefore, a turn-ON time and a turn-OFF time are needed. Consequently, if an ON-command for the upper-arm FET and an OFF-command for the lower-arm FET are simultaneously inputted, there is a problem that the upper-arm FET and the lower-arm FET simultaneously turn ON and the upper-arm and the lower-arm become short circuits. There is a difference between the turn-ON time and the turn-OFF time of the FET. Thus, when the command is inputted into the FETs at the same time, the FET immediately turns ON in a case that the turn-ON time is short (for example, 100 [ns]) by inputting the ON-command to the upper-FET, and reversely, the FET does not immediately turns OFF in a case that the turn-OFF time is long (for example, 400 [ns]) by inputting the OFF-command to the lower-FET. In this way, a state (for example, between 400 [ns]-100 [ns], ON-ON) that the upper-FET is ON and the lower FET is ON, often momentarily occurs.

In this connection, in order not to occur that the upper-arm FET and the lower-arm FET do not simultaneously turn ON, the ON-signal is usually given to the gate driving circuit with a predetermined period being a dead time. Since the dead time is nonlinear, the current waveform is distorted, the responsibility of the control goes down and the sound, the vibration and the torque ripple are generated. In a column type electric power steering apparatus, since an arrangement of the motor directly connected to a gear box which is connected by the steering wheel and the column shaft made of steel is extremely near the driver in the mechanism, it is necessary to especially consider the sound, the vibration, the torque ripple due to the motor in comparison with a downstream type electric power steering apparatus.

Conventionally, as a method to compensate the dead time of the inverter, there are methods to add the compensation value by detecting a timing occurring the dead time and to compensate the dead time by a disturbance observer on the dq-axes in the current control.

The electric power steering apparatus to compensate the dead time is disclosed in, for example, Japanese Patent No. 4681453 B2 (Patent Document 1) and Japanese Published Unexamined Patent Application No. 2015-171251 A (Patent Document 2). In Patent Document 1, there is provided a dead band compensating circuit that generates a model current based on the current command values by inputting the current command values into a reference model circuit of the current control loop including the motor and the inverter, and compensates the influence of the dead time of the inverter based on the model current. Further, in Patent Document 2, there is provided a dead time compensating section to correct based on the dead time compensation value for the duty command value, and the dead time compensating section comprises a basic compensation value calculating section to calculate a basic compensation value being a basic value of the dead time compensation value based on the current command value and a filtering section to perform a filtering-process corresponding to a low pass filter (LPF) for the basic compensation value.

THE LIST OF PRIOR ART DOCUMENTS

Patent Documents

Patent Document 1: Japanese Patent No. 4681453 B2
Patent Document 2: Japanese Published Unexamined Patent Application No. 2015-171251 A

SUMMARY OF THE INVENTION

Problems to be Solved by the Invention

The apparatus disclosed in Patent Document 1 is a system that estimates the compensation sign by using a calculation of the dead time compensation amount due to the q-axis current command value and the 3-phase current reference model. The output value of the compensating circuit is a changing value in proportion to the model current in a region being a predetermined fixed value or less, and is an addition value of the changing values in proportion to the fixed value and the model current in a region being more than the predetermined fixed value. In this way, the output value of the compensating circuit is outputted from the current command to the voltage command. However, the tuning working for determining the hysteresis characteristic to output the predetermined fixed value is necessary.

Further, in the apparatus disclosed in Patent Document 2, when the dead time is determined, the dead time compensation is performed by using the q-axis current command value and the compensation value LPF-processed the q-axis current command value. Thus, the delay occurs, and there is a problem that the dead time compensation value is not operated for the final voltage command to the motor.

Furthermore, there is a case that plural dead time compensating functions are switched in a specific region in order to improve the steering performance. For example, in the high speed steering maneuver, the steering characteristic of the dead time compensation value greatly varies in other than case that the d-axis current command value is "0 [A]". In this connection, in a case that a whole region is compensated by using the dead time compensation of the single function, the compensation accuracy goes down in a specific region and the torque ripple, the sound and the vibration sometime occur.

In the feed forward type dead time compensation (an angle feed forward type, a current command value model type), since the current flows in the motor with an exclusive software by locking the motor output shaft, the necessary dead time compensation amount is needed to measure by using the actual machine. It is needed the tuning operation of the threshold value for determining the compensation sign due to the phase adjustment and the current command value by rotating a single motor under a constant load and a constant rotation speed by using a motor test apparatus. It is necessary to allot the inverter applying voltage and the motor rotational number and to perform plural times, and therefore the mitigation of the tuning operation is required.

Further, in the feed forward type dead time compensation, the chattering occurs near zero-cross time or at the low load and the low speed steering maneuver in a case that the sign is not switched with an appropriate compensation amount and on an appropriate timing. By inputting the dead time compensation that the compensation amount is unsuitable or the dead time compensation that the timing is unsuitable, there is a case that the chattering is often caused by the control itself. In the feed forward type dead time compensation, in order to suppress the above chattering, a quite accurate tuning operation such as various ideas and the strict switching of the compensation sign is needed.

The present invention has been developed in view of the above-described circumstances, and an object of the present invention is to provide the electric power steering apparatus that, in the electric power steering apparatus of a vector control system, has plural dead time compensating functions to compensate the dead time of the inverter without the tuning operation, compensates with the feed forward method by switching the dead time compensating functions corresponding to the steering state, improves the steering performance, improves the distortion of the current waveform and the responsibility of the current control, and suppresses the sound, the vibration and the torque ripple.

Means for Solving the Problems

The present invention relates to the electric power steering apparatus of a vector control system that calculates steering assist command values of dq axes based on at least a steering torque, calculates dq-axes current command values from the steering assist command values, converts the dq-axes current command values into 3-phase duty command values, driving-controls a 3-phase brushless motor by an inverter of a pulse width modulation (PWM) control, and applies an assist torque to a steering system of a vehicle, the above-described object of the present invention is achieved by that the electric power steering apparatus has plural dead time compensating functions of which efficiencies to respectively perform a dead time compensation of the inverter are different each other, and performs the dead time compensation by switching from one of the plural dead time compensating functions to an another dead time compensating function with a predetermined condition.

Further, the present invention relates to the electric power steering apparatus of a vector control system that calculates steering assist command values of dq axes based on at least a steering torque, calculates dq-axes current command values from the steering assist command values, converts the dq-axes current command values into 3-phase duty command values, driving-controls a 3-phase brushless motor by an inverter of a pulse width modulation (PWM) control, and applies an assist torque to a steering system of a vehicle, the above-described object of the present invention is achieved by that comprising: a dead time compensating section A that calculates first dq-axes compensation values relating to the dq-axes of the inverter based on a motor rotational angle of the 3-phase brushless motor; a dead time compensating section B that inputs the dq-axes current command values, and calculates second dq-axes compensation values relating to the dq-axes of the inverter based on a current command value model; and a compensation value switching section that outputs dq-axes dead time compensation values by switching the first dq-axes compensation values and the second dq-axes compensation values based on the dq-axes current command values and the steering assist current command value of the q-axis, wherein a dead time compensation of the inverter is performed by a correction of the dq-axes current command values with the dq-axes dead time compensation values.

Effects of the Invention

The electric power steering apparatus according to the present invention performs the compensation of the dead time in an optimum state corresponding to the steering state by switching plural dead time compensating functions (for example, a dead time compensating function (A) of the inverter based on a motor rotational angle (electric angle) and a dead time compensating function (B) based on a current command value model) with a predetermined condition, and therefore it is possible to further improve the steering performance. The dead time compensating function (A) of the inverter based on the motor rotational angle (electric angle) has a feature that the compensation accuracy is high in the low speed steering region and the while speed steering region of which phases match in the angle and the phase-current and it is possible to compensate even in a case that the compensation waveforms of three phases are not rectangular wave. Further, the dead time compensating function (B) based on a current command value model has a feature that the phase shift is small even in the high speed steering and it is possible to simply perform the dead time compensation. In the present invention, since the compensating functions A and B are switched in accordance with the steering state, it is possible to realize the most suitable steering having the above two features.

In the present invention, the dq-axes current command values are converted into the current model command values of three phases, the compensation sign is estimated, and the dead time compensation amount of the inverter is calculated from the inverter-applying voltage. Then, based on the dead time compensation amount, the dead time compensation is performed by adding (feed forward) the 2-phase voltages converted from the dead time compensation values due to the estimated compensation sign to the voltage command values on the dq-axes, or applying the dead time compensation values that the compensation values calculated from the motor rotational angle, the motor rotational number and the inverter-applying voltage are limited by the current command value sensitive-gain based on the current control delay model due to the steering assist command value of the q-axis, to the voltage command values on the dq-axes. Thereby, it is possible to perform the dead time compensation without the tuning operation, to improve the distortion of the current waveform and the responsibility of the current control.

MODE FOR CARRYING OUT THE INVENTION

Figure 1:
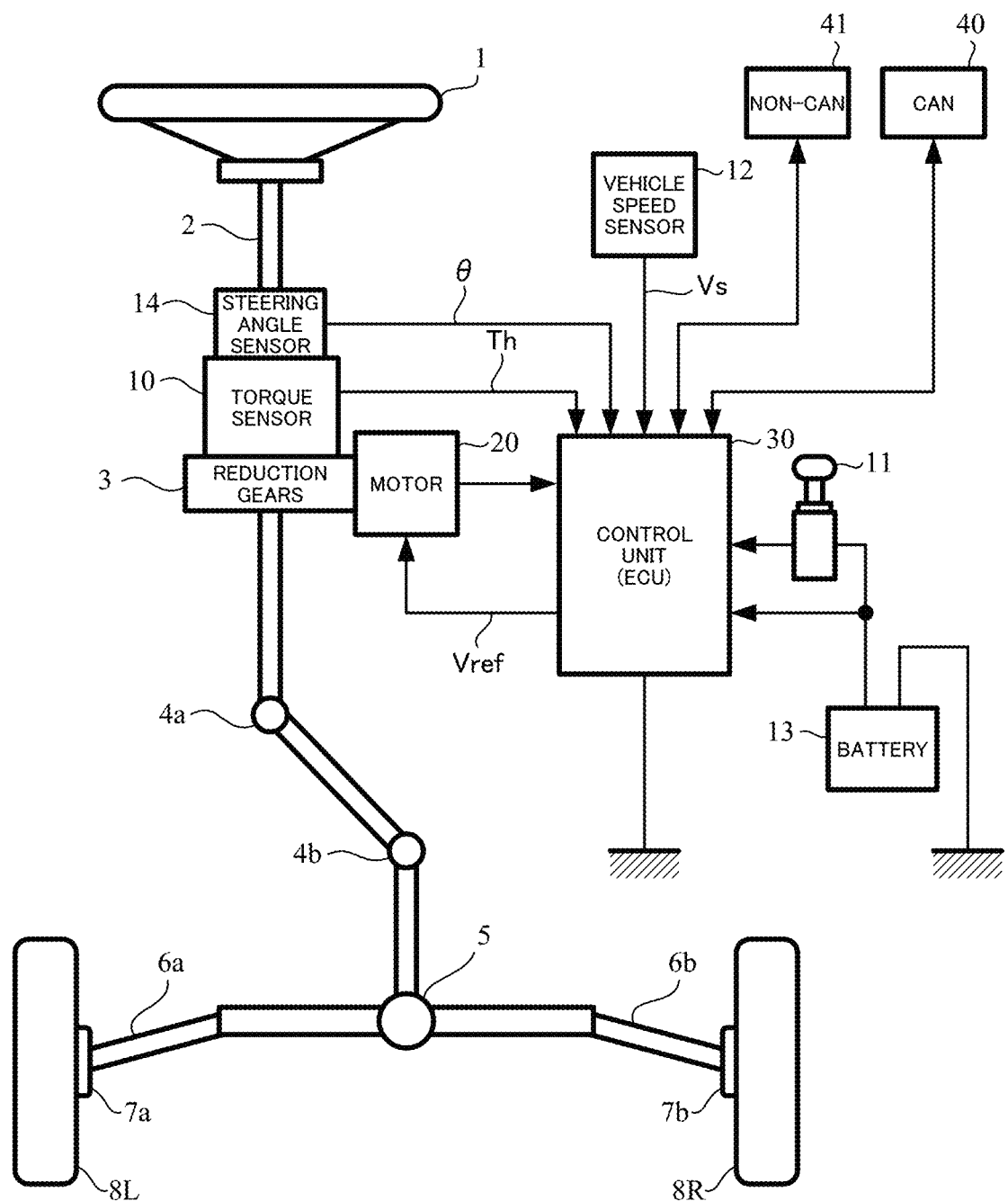
FIG. 1 is a configuration diagram showing a general outline of an electric power steering apparatus.

In order to resolve a problem that a current distortion and a torque ripple occur due to an influence of a dead time of an inverter in a control unit (ECU) and a steering sound goes down, the present invention performs a dead time compensation of the inverter by switching a dead time compensating function (A) based on a function corresponding to a motor rotational angle (electric angle) and a dead time compensating function (B) based on a current command value model with a determined condition and by applying on dq-axes with a feed forward.

According to the dead time compensating function due to a single algorithm of a single function, although a compensation accuracy is good in a low speed steering maneuver, it sometime goes down in a high speed steering maneuver. Or, although the compensation accuracy is good in a high load state, it sometime goes down in a low load state. Thus, it is impossible to accurately compensate a whole steering region by the dead time compensation due to the single algorithm of the single function. However, the present invention prepares plural dead time compensating functions which respectively have high compensation accuracies in the steering states, and switches the dead time compensating functions to the optimum compensation function in accordance with the steering state. Consequently, the present invention can perform the dead time compensation with the high accuracy for the whole steering region In the present invention, the dead time compensations based on the plural compensating functions are individually performed for the d-axis voltage command value and the q-axis voltage command value of the dq-axes vector control system, the dead time compensating functions are switched with the predetermined condition defined by the d-axis current command value, the q-axis current command value and the motor rotational number, and then the most suitable dead time compensation value is selected in the whole region of the low speed steering region, the while speed steering region and the high speed steering region. The embodiments according to the present invention are the constitution that has two dead time compensating functions A and B, performs a switch judgment at a switch judging section with the switch condition of the d-axis current command value, the q-axis current command value and the motor rotational number, and switches (condition branching section) the dead time compensating functions A and B by the software. In order to rapidly perform a switching timing of the dead time compensating functions A and B, the condition branching section being capable of switching simultaneously is used without a mixing section to need a constant time for the switch.

As well, although there are differences due to the type of the motor, a reduction ratio of the reduction gears of the EPS and so on, for example, the motor rotational number of the low speed steering region is 0 to 300 [rpm], the motor rotational number of the while speed steering region is 300 to 1800 [rpm], and the motor rotational number of the high speed steering region is 1800 to 4000 [rpm] which is equal to or more than a rated rotational number (the rotational number region needed a field-weakening control) of the motor.

Embodiments according to the present invention will be described in detail with reference to the drawings.

Figure 3:
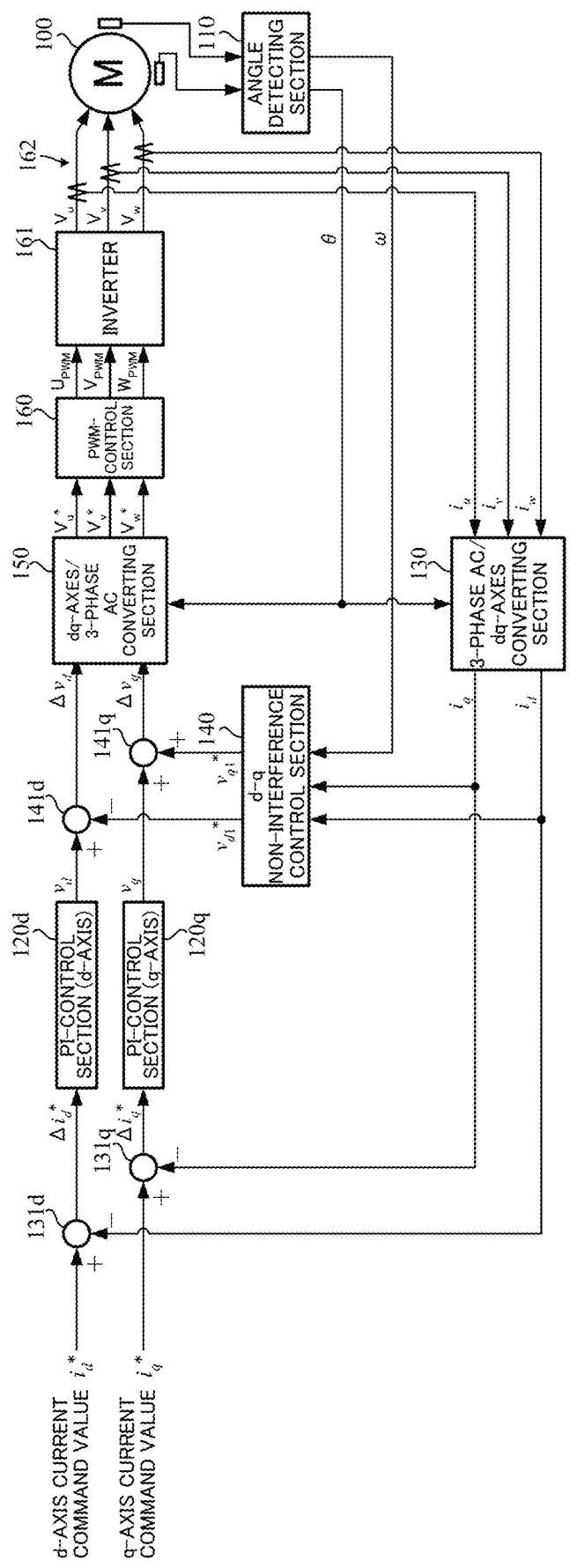
FIG. 3 is a block diagram showing a configuration example of a vector control system.
Figure 4:
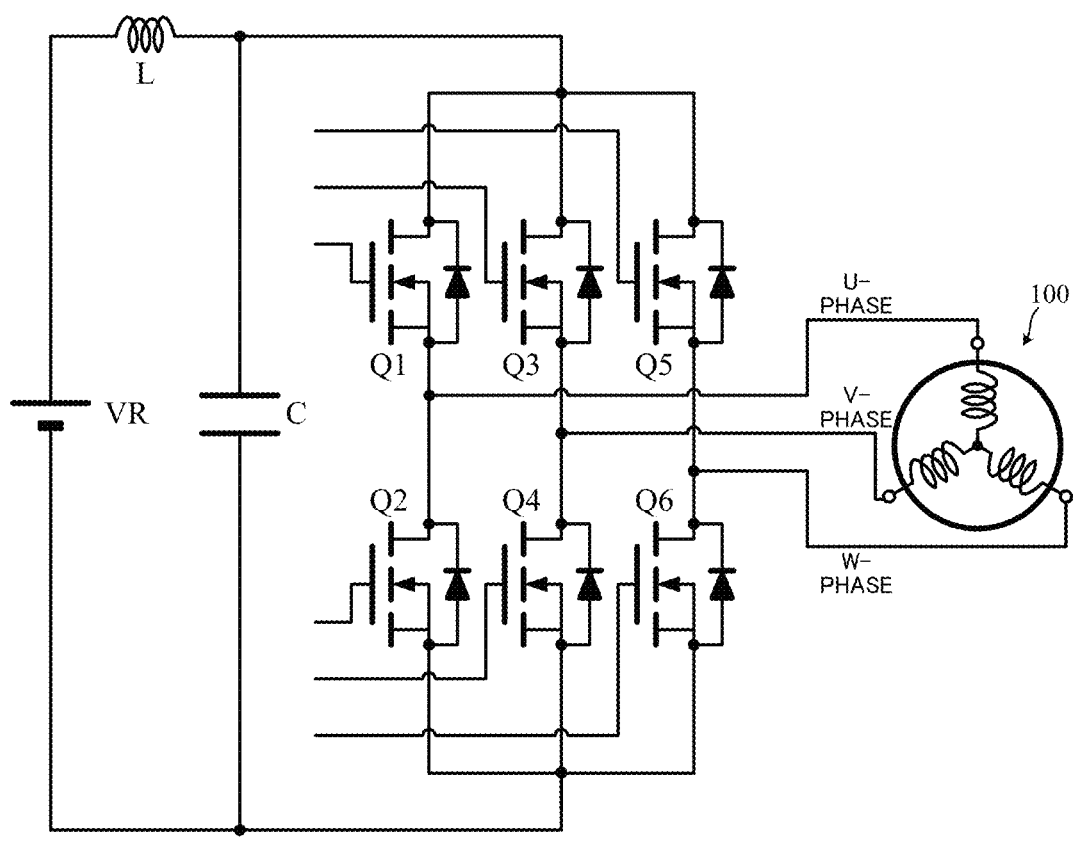
FIG. 4 is a wiring diagram showing a configuration example of a general inverter.
Figure 5:
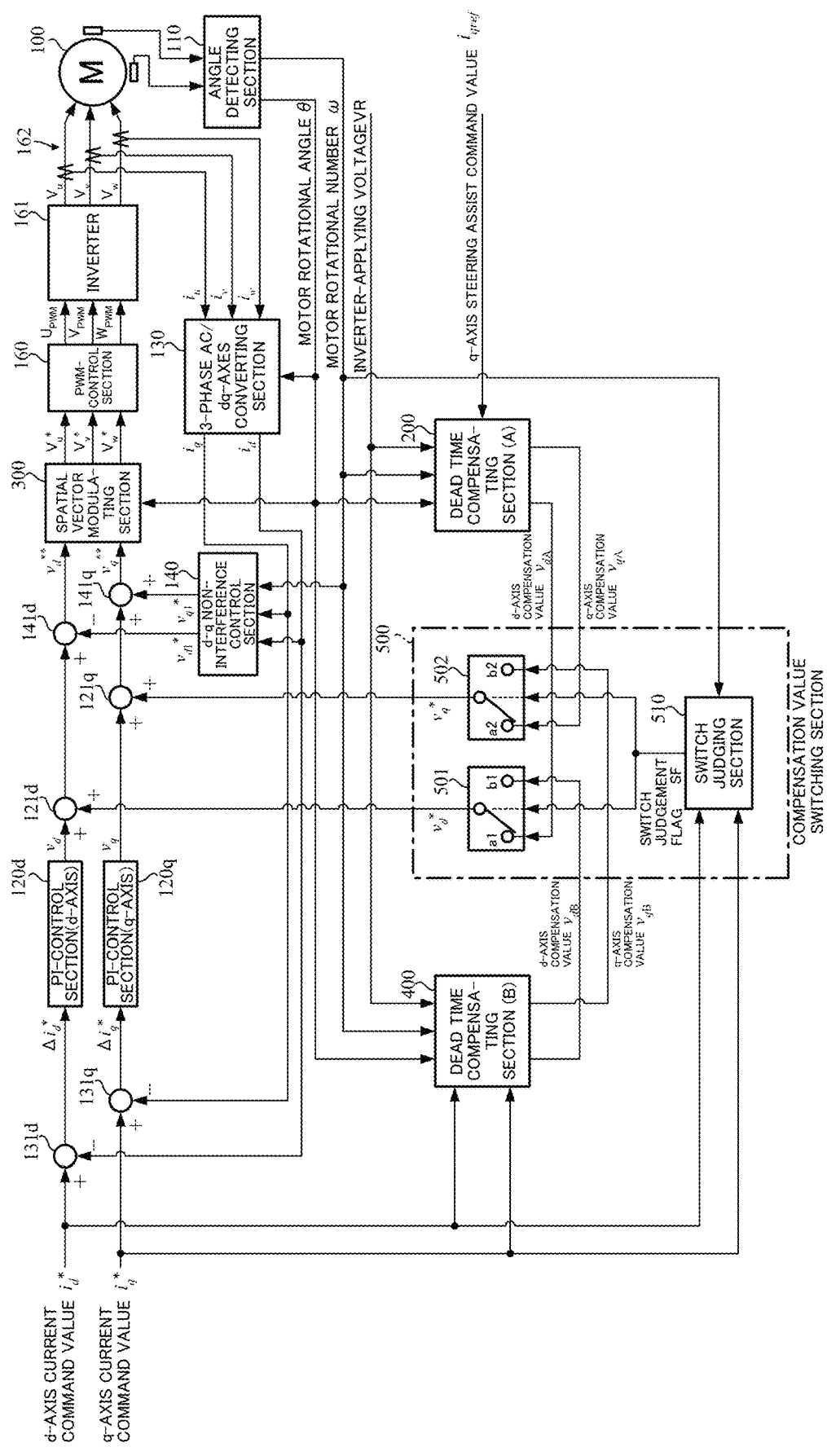
FIG. 5 is a block diagram showing a configuration example of the present invention.

FIG. 5 shows a whole configuration example of the present invention corresponding to FIG. 3, and there are provided a dead time compensating section 200 (A) to calculate compensation values vdA and vqA on the dq-axes, a dead time compensating section 400 (B) to calculate compensation values vdB and vqB on the dq-axes and a compensation value switching section 500 to output dead time compensation values vd* and vq* by switching the compensation values vdA and vqA and the compensation values vdB and vqB with a predetermined condition. The dead time compensating function section 200 has a characteristic that the compensation accuracy is high in the low speed steering region and the while speed steering region, and alternatively the dead time compensating section 400 (B) has a characteristic that the compensation accuracy is high in the high speed steering region.

Figure 2:
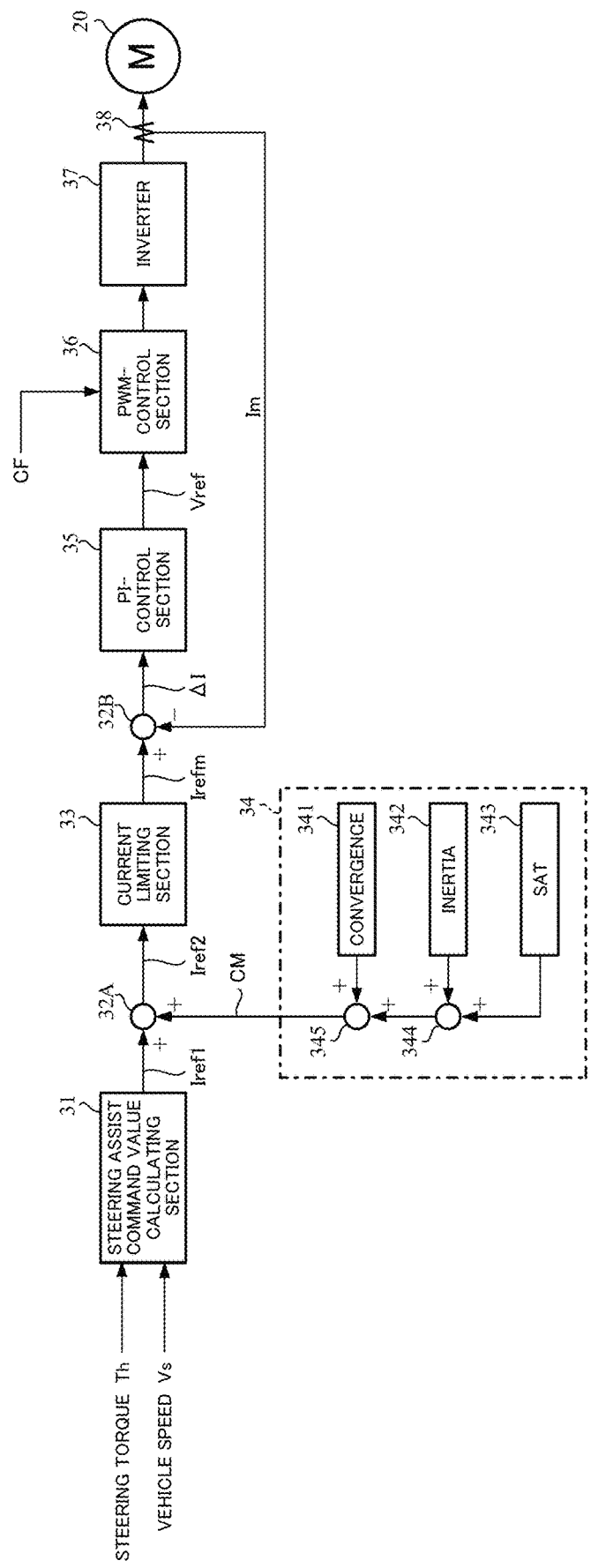
FIG. 2 is a block diagram showing a configuration example of a control unit (ECU) of the electric power steering apparatus.

Into the dead time compensating section 200 (the details will be explained later), the steering assist command value iqref of the d-axis corresponding to the steering assist command value Iref2 in FIG. 2 as well as the inverter-applying voltage VR applied to the inverter 161, the motor rotational angle θ and the motor rotational number ω are inputted. Into the dead time compensating section 400 (the details will be explained later), the d-axis current command value id*, the q-axis current command value iq*, the motor rotational angle θ, the inverter-applying voltage VR and the motor rotational number ω are inputted. Further, the compensation value switching section 500 comprises a switch judging section 510 to judge the switch of the compensation values and condition branching sections 501 and 502, with the software, to switch the compensation values vdA and vqA from the dead time compensating section 200 (A) and the compensation values vdB and vqB from the dead time compensating section 400 (B) to calculate compensation values vdB and vqB in accordance with a switch judgment flag SF and to then output.

The condition branching section 501 functionally has contact points a1 and b1, and the compensation value vdA is inputted into the contact point a1 and the compensation value vdB is inputted into the contact point b1. Similarly, the condition branching section 502 functionally has contact points a2 and b2, and the compensation value vqA is inputted into the contact point a2 and the compensation value vqB is inputted into the contact point b2. The contact points a1 and b1 of the condition branching section 501 and the contact points a2 and b2 of the condition branching section 502 are in synchronization switched by the switch judgment flag SF from the switch judging section 510. That is, the contact points are "a1" and "a2" when the switch judgment flag SF is not inputted (e.g. logic "L"), and the compensation values vdA and vqA are outputted as the dead time compensation values vd* and vq*. Alternatively, the contact points are "b1" and "b2" when the switch judgment flag SF is inputted (e.g. logic "H"), and the compensation values vdB and vqB are outputted as the dead time compensation values vd* and vq*.

Figure 6:
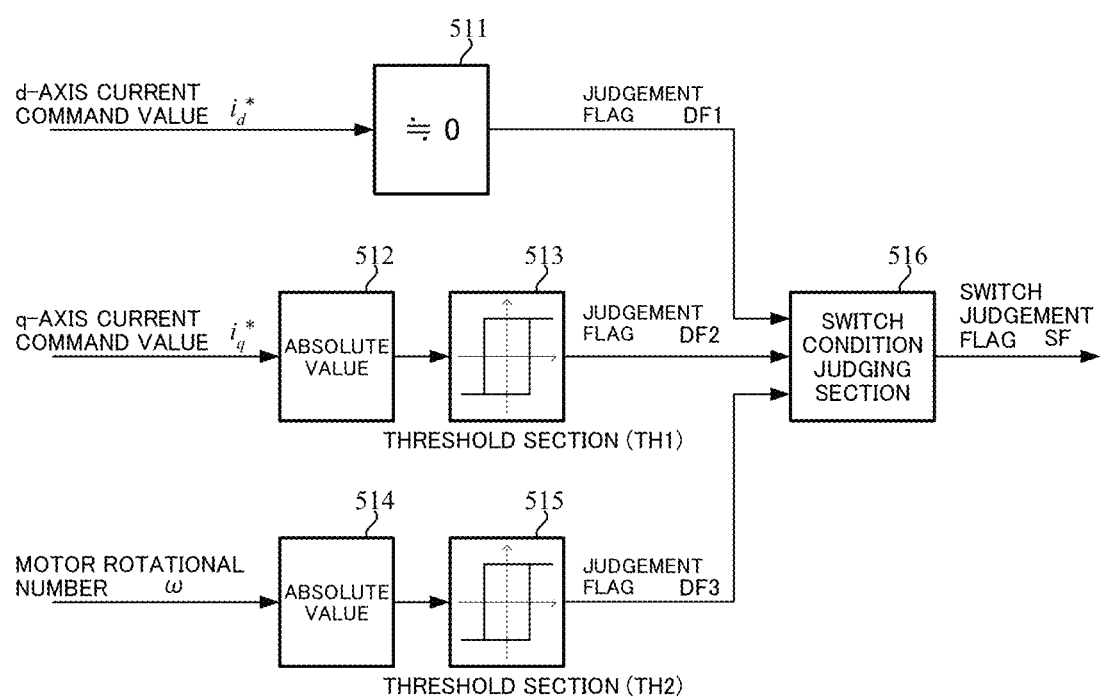
FIG. 6 is a block diagram in details showing a configuration example of a switch judging section.

The switch judging section 510 is a configuration as shown in FIG. 6 and includes a zero judging section 511 to output a judgment flag DF1 when the d-axis current command value id* is zero or vicinity (for example, 0.1 [A] or less). The switch judging section 510 further comprises an absolute value section to obtain an absolute value |iq*| of the q-axis current command value iq*, a threshold section 513 having a hysteresis characteristic and outputting a judgment flag DF2 when the absolute value |iq*| is equal to or more than a predetermined threshold value TH1, an absolute value section 514 to obtain an absolute value |ω| of the motor rotational number ω, and threshold section 515 having a hysteresis characteristic and outputting a judgment flag DF3 when the absolute value |ω| is equal to or more than a predetermined threshold value TH2. The judgment flags DF1 to DF3 are inputted into the switch condition judging section 516, and the switch condition judging section 516 outputs the switch judgment flag SF when all of the judgment flags DF1 to DF3 are inputted.

The contact points of the of the condition branching sections 501 and 502 are respectively "a1" and "a2" when the switch judgment flag SF is not inputted (e.g. logic "L"), and the compensation values vdA and vqA from the dead time compensating section (A) 200 are outputted as the dead time compensation values vd* and vq*. Then, the contact points of the condition branching sections 501 and 502 are switched from "a1" and "a2" to "b1" and "b2" when the switch judgment flag SF is outputted (e.g. logic "H"). As a result, the compensation values vdB and vqB are outputted as the dead time compensation values vd* and vq* and respectively inputted into the adding section 121d and 121q.

A d-axis current command value id* and a q-axis current command value iq* of the vector control are respectively inputted into subtracting sections 131d and 131q, and current deviations Δid* and Δiq* for the feedback currents id and iq are respectively calculated at the subtracting sections 131d and 131q. The calculated current deviation Δid* is inputted into the PI-control section 120d, and the calculated current deviation Δiq* is inputted into the PI-control section 120q. The PI-controlled d-axis voltage command value vd and q-axis voltage command value vq are respectively inputted into the adding section 121d and 121q, the dead time compensation values vd* and vq* from the dead time compensating section 200 described below are added and compensated at the adding section 121d and 121q, and the compensated voltage values are respectively inputted into the subtracting section 141d and the adding section 141q. The voltage vd1* from the d-q non-interference control section 140 is inputted into the subtracting section 141d, and the voltage command value vd** being the difference is obtained. The voltage vq1* from the d-q non-interference control section 140 is inputted into the adding section 141q, and the voltage command value vq being the added result is obtained. The voltage command value vd and vq** which are dead time-compensated are inputted into a spatial vector modulating section 300 that converts the two phases of the dq-axes into three phases of U-phase, V-phase, W-phase and superposes the third harmonic wave. Voltages command values Vu*, Vv*, Vw* of the three phases vector-modulated at the spatial vector modulating section 300 are inputted into the PWM-control section 160, and the motor 100 is driving-controlled via the PWM-control section 160 and the inverter 161 as described above.

Next, the dead time compensating section 200 will be described.

Figure 7:
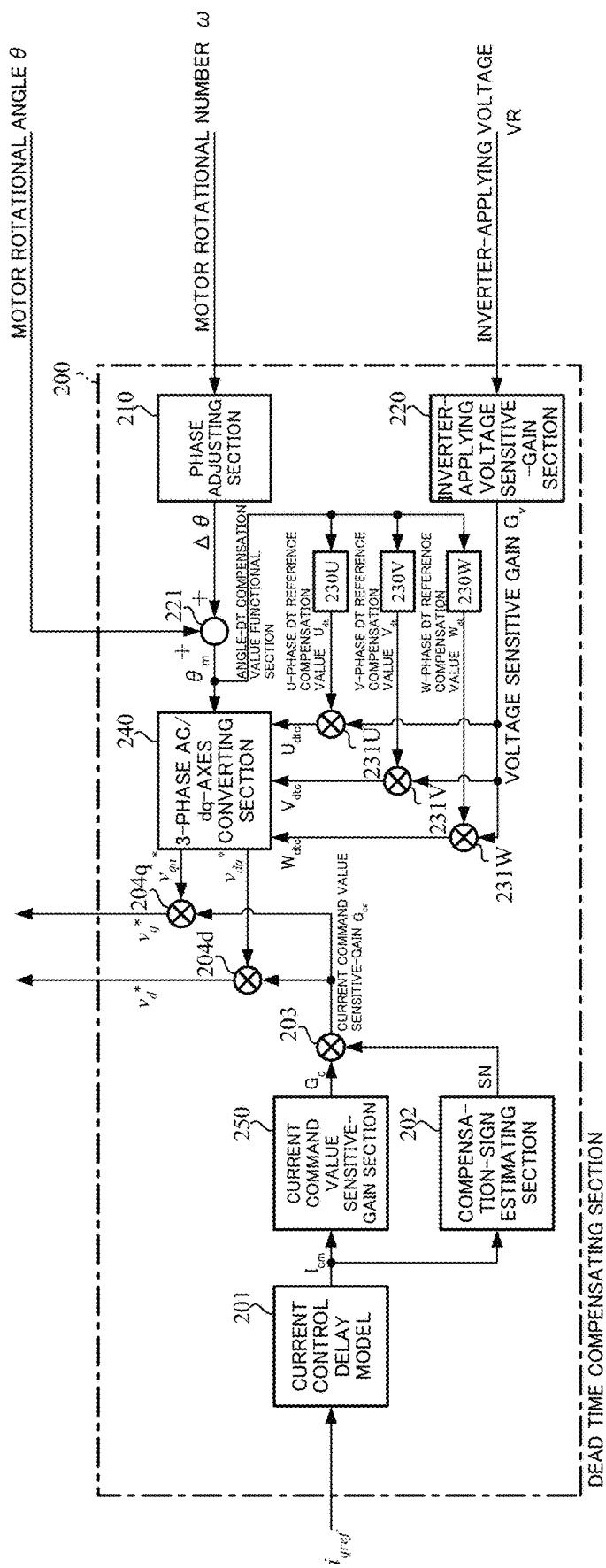
FIG. 7 is a block diagram showing a configuration example of a dead time compensating section (A)

As shown in FIG. 7, the dead time compensating section 200 comprises a current control delay section 201, a compensation-sign estimating section 202, multiplying sections 203, 204d and 204q, an adding section 221, a phase adjusting section 210, an inverter-applying voltage sensitive-gain section 220, angle-dead time compensation value functional sections 230U, 230V and 230W, multiplying sections 231U, 231V and 231W, a 3-phase alternative current (AC)/dq-axes converting section 240 and a current command value sensitive-gain section 250.

As well, the multiplying sections 231U, 231V and 231W and the 3-phase AC/dq-axes converting section 240 constitute a dead time compensation value outputting section. Further, the current control delay section 201, the compensation-sign estimating section 202, the current command value sensitive-gain section 250 and the multiplying section 203 constitute a current command value sensitive-gain calculating section.

Figure 8:
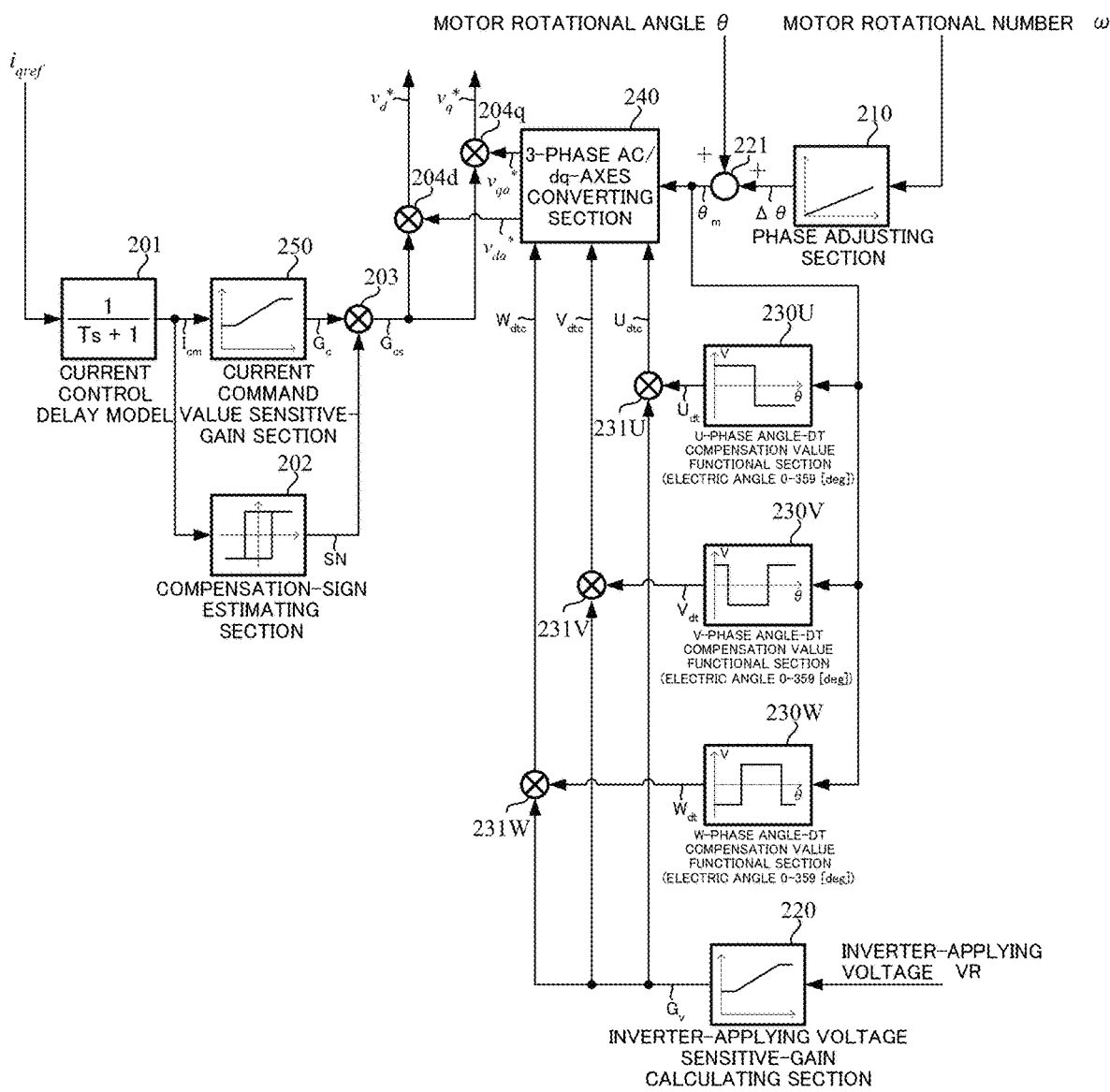
FIG. 8 is a block diagram in details showing a configuration example of the dead time compensating section (A)

The detail configuration of the dead time compensating section 200 is shown in FIG. 8, and hereinafter the explanation will be described with reference to FIG. 8.

The q-axis steering assist command value iqref is inputted into the current control delay model 201. The delay occurs due to the noise filters or the like in the ECU till dq-axes current command values id* and iq* are reflected to the actual currents. Thus, when the sign is directly judged from the current command value iq*, the timing shift is occurred sometime. In order to resolve the problem, the delay of the whole current control is approximated as a primary filter model and then the phase shift is improved. The current control delay model 201 is the primary filter expressed by the below Equation 1, where T is a filter time constant. The current control delay model 201 may be a secondary filter being equal to or more than two order.

$$\frac{1}{Ts+1} \quad \text{[Equation 1]}$$

A current command value Icm outputted from the current control delay model 201 is inputted into the current command value sensitive-gain section 250 and the compensation-sign estimating section 202. The dead time compensation amount sometime becomes overcompensation in the low current region, and therefore the current command value sensitive-gain section 250 has a function to calculate a gain Gc lowering the compensation amount depending on the current command value Icm (the steering assist command value iqref). Further, the current command value sensitive-gain section 250 uses a weighted average filter 254 so that the gain Gc lowering the compensation amount does not vibrate due to the noise from the current command value Icm (the steering assist command value iqref) or the like, and aims to reduce the noise.

Figure 9:
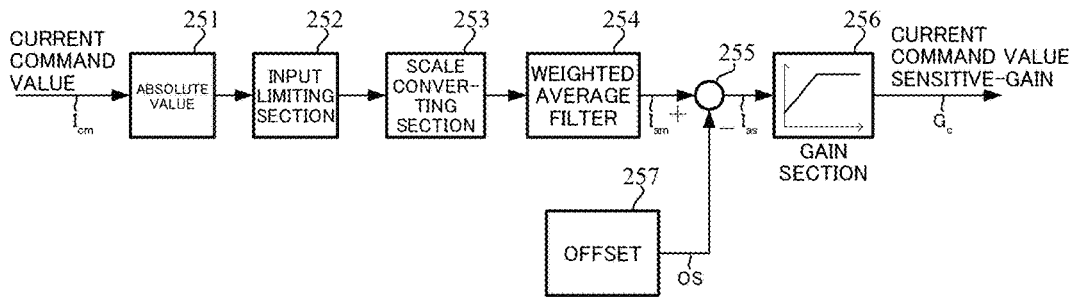
FIG. 9 is a block diagram showing a configuration example of a current command value-sensitive gain section.
Figure 10:
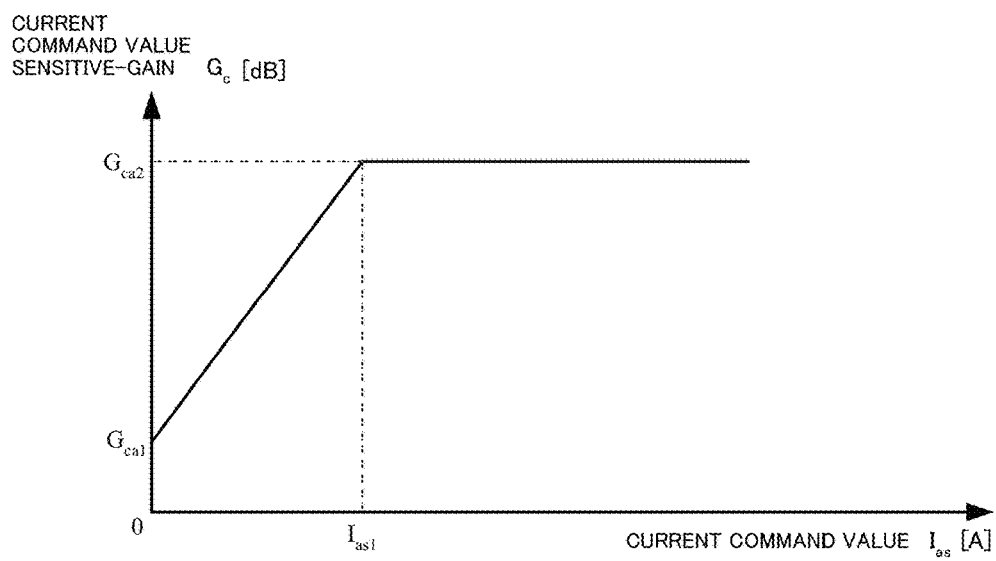
FIG. 10 is a characteristic diagram of a gain section in the current command value-sensitive gain section.

The configuration of the current command value sensitive-gain section 250 is shown in FIG. 9, and the current command value Icm becomes an absolute value |Icm| at an absolute value section 251. The absolute value |Icm| is limited the maximum value at an input limiting section 252, and the current command value of the absolute value whose maximum current is limited is inputted into the weighted average filter 254. The current command value Iam that the noise is reduced at the weighted average filter 254 is addition-inputted into a subtracting section 255, and the inputted current command value Iam is subtracted a predetermined offset OS at the subtracting section 255. The reason of the subtraction of the offset OS is to prevent an occurrence of chattering due to a minute current command value, and the input value being equal to or less than the offset OS is fixed to the minimum gain. The offset OS is a constant value. The current command value Ias which is subtracted the offset OS at the subtracting section 255 is inputted into a gain section 256, and the gain section 256 outputs a current command value sensitive-gain Gc according to a gain characteristic as shown in FIG. 10.

Figure 11:
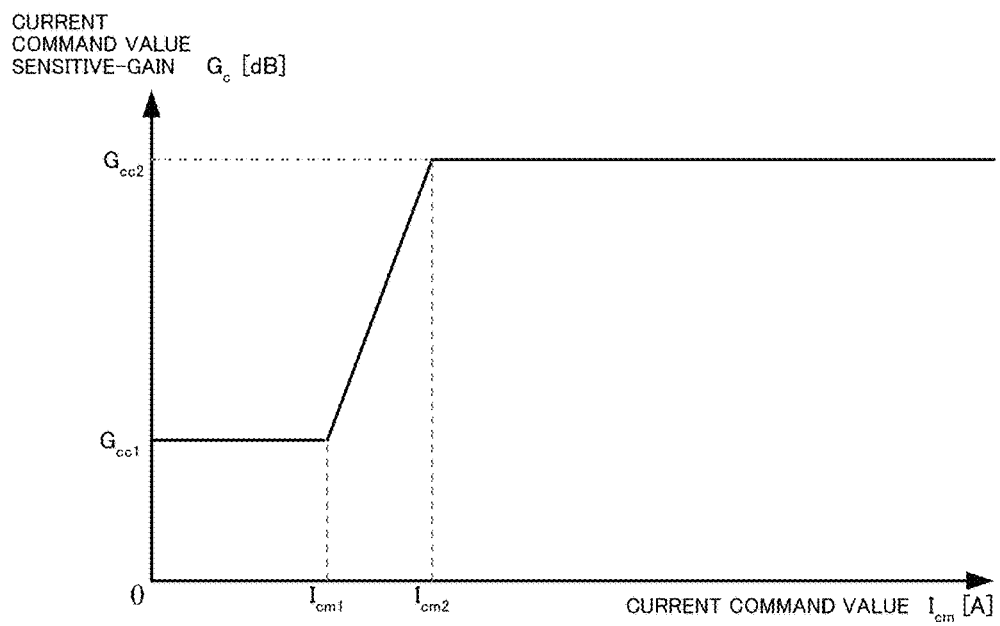
FIG. 11 is a characteristic diagram showing a characteristic example of the current command value sensitive-gain section.

The current command value sensitive-gain Gc outputted from the current command value sensitive-gain section 250 is a characteristic for the inputted current command value Icm, for example, as shown in FIG. 11. That is, the current command value sensitive-gain Gc is a constant gain Gcc1 till a predetermined current Icm1, linearly (non-linearly) increases from the predetermined current Icm1 to a predetermined current Icm2 (>Icm1), and holds a constant gain Gcc2 more than the predetermined current Icm2. Besides, the predetermined current Icm1 may be zero.

Figure 12A:
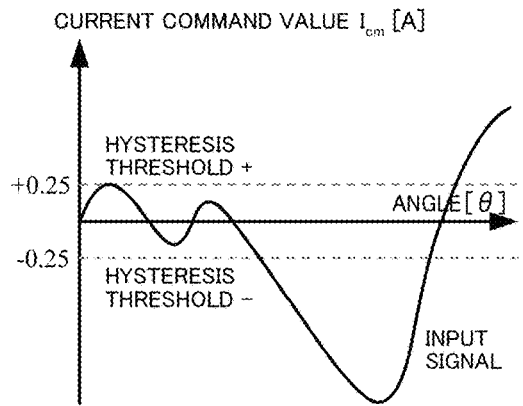
FIGS. 12A and 12B are waveform charts showing an operation example of a compensation-sign estimating section.
Figure 12B:
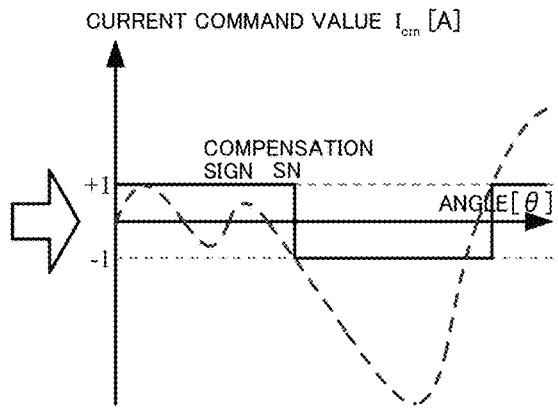

The compensation-sign estimating section 202 outputs a compensation sign SN of a positive (+1) or a negative (−1) with a hysteresis characteristic shown in FIGS. 12A and 12B for the current command value Icm. Although the compensation sign is estimated as reference being a point that the current command value Icm crosses zero, the hysteresis characteristic is set for suppressing the chattering. The estimated compensation sign SN is inputted into the multiplying section 203. As well, the positive and negative thresholds (±0.25 [A] for the example shown in FIG. 12A) of the hysteresis characteristic are appropriately changeable.

The current command value sensitive-gain Gc from the current command value sensitive-gain section 250 is inputted into the multiplying section 203, and the multiplying section 203 outputs a current command value sensitive-gain Gcs (=Gc×SN) multiplied the compensation sign SN. The current command value sensitive-gain Gcs is inputted into the multiplying sections 204$d$ and 204$q$.

Figure 13:
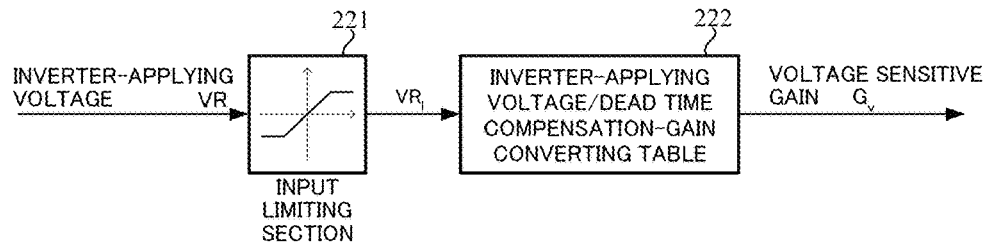
FIG. 13 is a block diagram showing a configuration example of an inverter-applying voltage sensitive-gain section.
Figure 14:
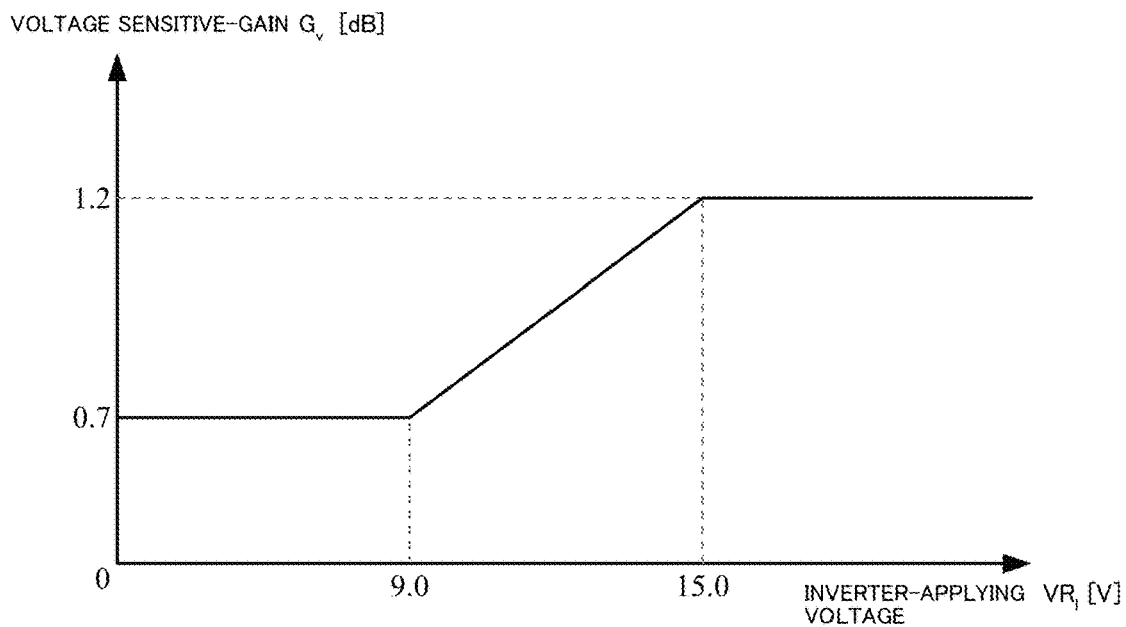
FIG. 14 is a characteristic diagram showing a characteristic example of the inverter-applying voltage sensitive-gain section.

Since the most suitable compensation amount varies depending on the inverter-applying voltage VR, the dead time compensating section 200 calculates the dead time compensation amount corresponding to the inverter-applying voltage VR and changes it. The inverter-applying voltage sensitive-gain section 220 inputting the inverter-applying voltage VR and outputting a voltage sensitive gain Gv is the configuration shown in FIG. 13. The inverter-applying voltage VR is limited the positive and negative maximum values at the input limiting section 221, and the inverter-applying voltage VR1 of which the maximum values are limited is inputted into an inverter-applying voltage/dead time compensation-gain converting table 222. The characteristic of the inverter-applying voltage/dead time compensation-gain converting table 222 is shown, for example, in FIG. 14. The inverter-applying voltages 9.0 [V] and 15.0 [V] of the inflection points and the voltage sensitive gains "0.7" and "1.2" are respectively examples and they are appropriately changeable. The voltage sensitive gain Gv is inputted into the multiplying sections 231U, 231V and 231W.

Figure 15:
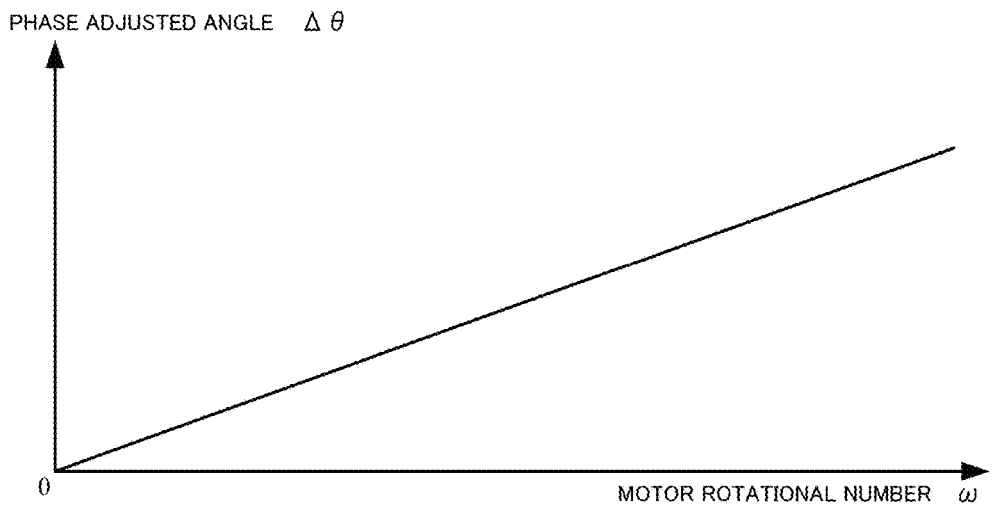
FIG. 15 is a characteristic diagram showing a characteristic example of a phase adjusting section.

In a case that the dead time compensation timing is led or delayed by the motor rotational number ω, there is provided the phase adjusting section 210 for a function to calculate a adjusted angle in accordance with the motor rotational number ω. The phase adjusting section 210 has a characteristic as shown in FIG. 15 in a case of a lead angle control, and the calculated phase adjusted angle Δθ is inputted into the adding section 221 and is added with the detected motor rotational angle θ. The motor rotational angle θm (=θ+Δθ) being an added result at the adding section 221 is inputted into angle-dead time compensation value functional sections 230U, 230V and 230W and the 3-phase AC/dq-axes converting section 240.

Figure 16:
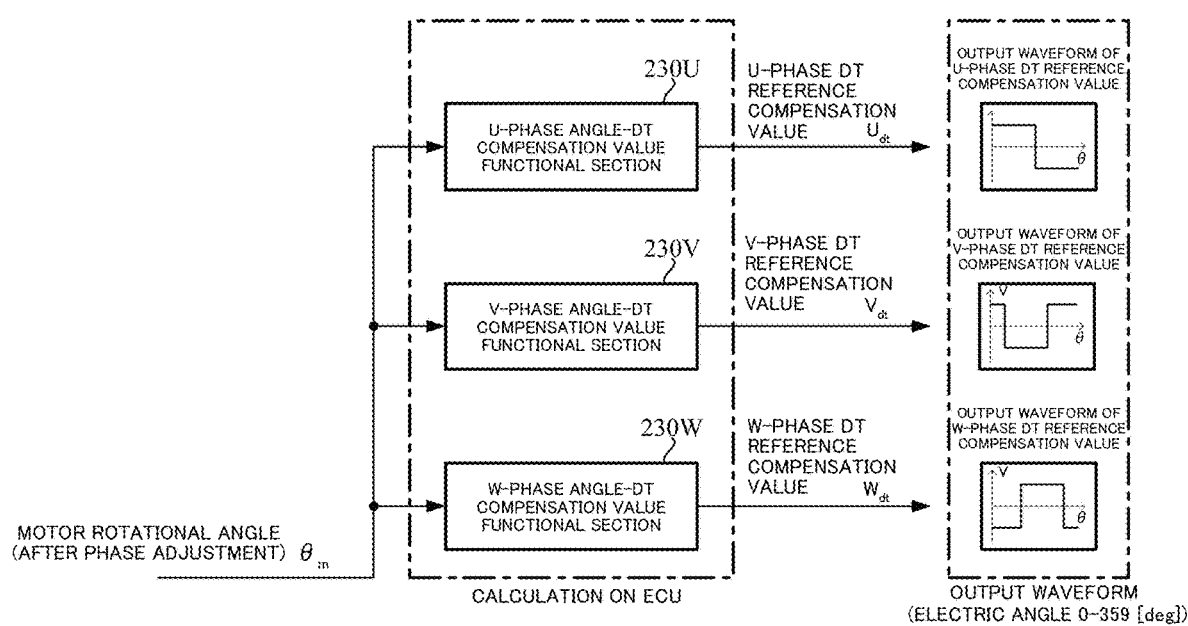
FIG. 16 is a diagram showing an operation example of a respective phase-angle-dead time compensation-value function section.

As the details of the angle-dead time compensation value functional sections 230U, 230V and 230W are shown in FIG. 16, they output respective phase dead time reference compensation values Udt, Vdt and Wdt of rectangular wave of which phases are respectively shifted by 120 [deg] in a range of the electric angle 0 to 359 [deg] for the motor rotational angel θm of which phase is adjusted. The angle-dead time compensation value functional sections 230U, 230V and 230W obtain the dead time compensation values needed in the three phases as the functions due to angle, calculate on a real time of the ECU, and output the dead time reference compensation values Udt, Vdt and Wdt. The angle functions of the dead time reference compensation values are different depending on the characteristic of the dead time of the ECU.

The dead time reference compensation values Udt, Vdt and Wdt are respectively inputted into the multiplying sections 231U, 231V and 231W, and are multiplied with the voltage sensitive gain Gv. The dead time compensation values Udtc (=Gv×Udt), Vdtc (=Gv×Vdt) and Wdtc (=Gv×Wdt) of the three phases are inputted into the 3-phase AC/dq-axes converting section 240. The 3-phase AC/dq-axes converting section 240 converts the dead time compensation values Udtc, Vdtc and Wdtc of the three phases into the dead time compensation values vda* and vqa* of the dq-axes. The dead time compensation values vda* and vqa* are respectively inputted into the multiplying sections 204$d$ and 204$q$, and are multiplied with the current command value sensitive-gain Gcs. The multiplied results at the multiplying sections 204$d$ and 204$q$ are the dead time compensation values vd* and vq*, the dead time compensation values vd* and vq* are respectively added to the voltage command values Vd and vq at the adding section 121$d$ and 121$q$, and then are inputted into the spatial vector modulating section 300 as the voltage command values vd and vq.

Figure 17:
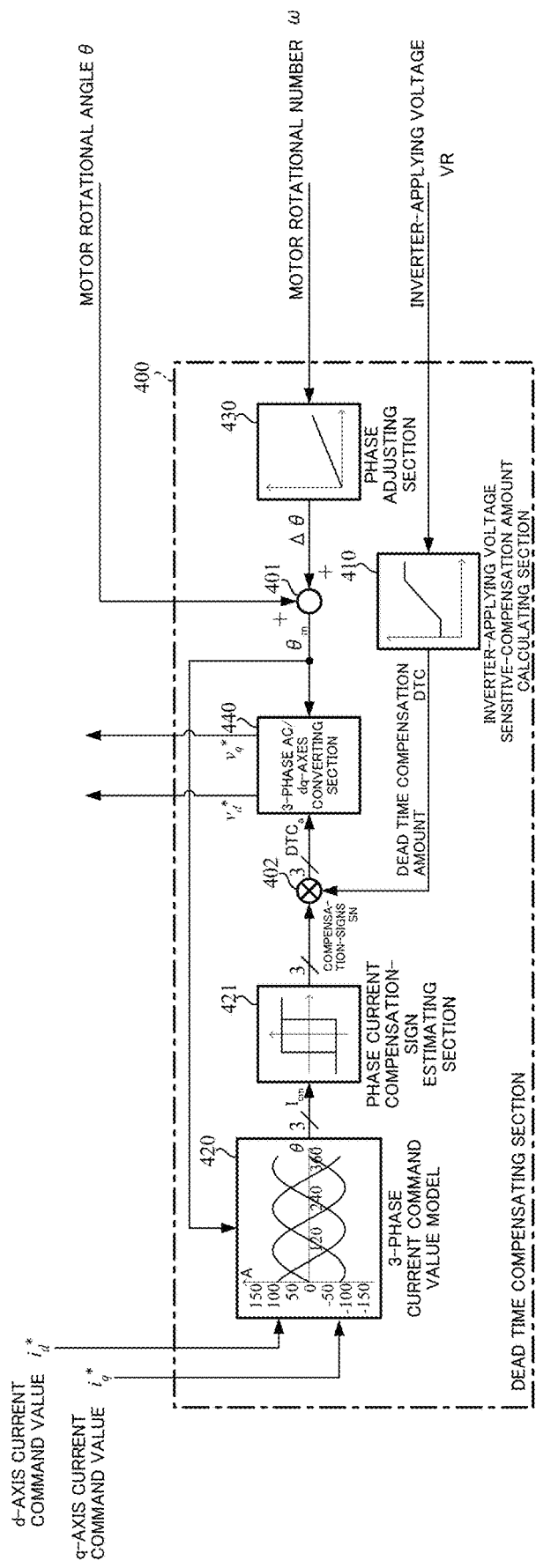
FIG. 17 is a block diagram showing a configuration example of a dead time compensating section (B)

Next, the dead time compensating section (B) 400 will be described with reference to FIG. 17.

The dead time compensating section 400 comprises an adding section 401, a multiplying section 402, an inverter-applying voltage sensitive-compensation amount calculating section 410, a 3-phase current command value model 420, a phase-current compensation-sign estimating section 421, a phase adjusting section 430 and a 3-phase AC/dq-axes converting section 440. As well, the multiplying section 402 and the 3-phase AC/dq-axes converting section 440 constitute a dead time compensation value output section. The motor rotational angle θ is inputted into the adding section 410, and the motor rotational number ω is inputted into the phase adjusting section 430. Further, the inverter-applying voltage VR is inputted into the inverter-applying voltage sensitive-compensation amount calculating section 410, and the motor rotational angle θm after the phase adjustment calculated at the adding section 401 is inputted into the 3-phase current command value model 420.

In a case that the dead time compensation timing is led or delayed by the motor rotational number ω, there is provided the phase adjusting section 430 for a function to calculate an adjusted angle in accordance with the motor rotational number ω. The phase adjusting section 430 has a characteristic as shown in FIG. 15 in a case of a lead angle control, and the calculated phase adjusted angle Δθ is inputted into the adding section 401 and is added with the detected motor rotational angle θ. The motor rotational angle θm (=θ+Δθ) being an added result at the adding section 401 is inputted into the 3-phase current command value model 420 and the 3-phase AC/dq-axes converting section 440.

There is a time lag of about several ten to a hundred [μs] from the detection of the motor rotational angle and the next calculation of the duty command values to the flection of the actual PWM signals. Since the motor is rotating during this time, the phase shift occurs between the electric angle in the calculation and the electric angle in the flection. In order to compensate the above phase shift, the dead time compensating section 400 performs a lead angle control corresponding to the motor rotational number ω and adjusts the phase.

Figure 18:
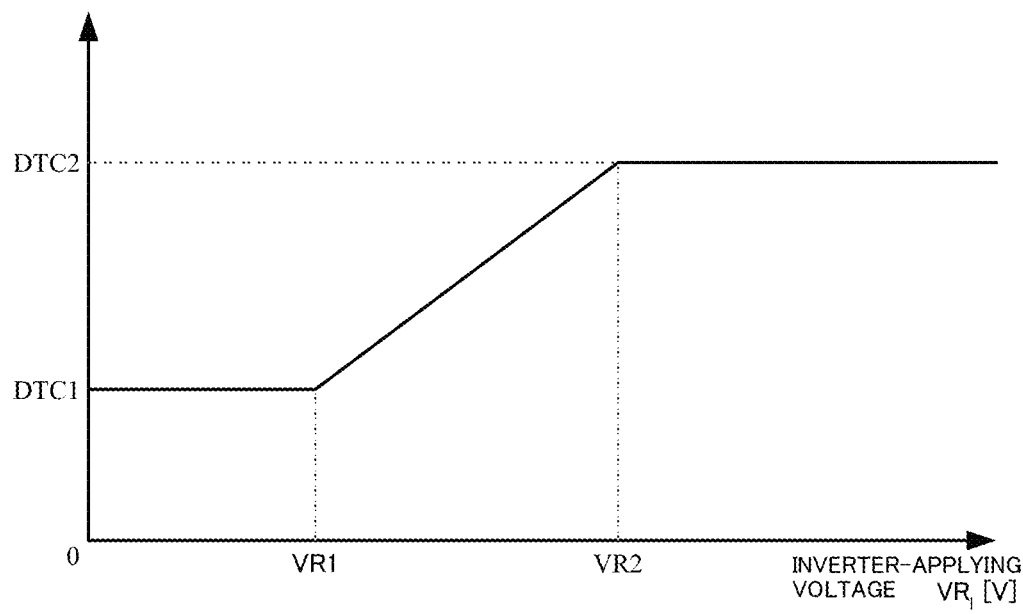
FIG. 18 is a characteristic diagram showing a characteristic example of an inverter-applying voltage sensitive-compensation amount calculating section.

Since the most suitable compensation amount varies depending on the inverter-applying voltage VR, the dead time compensating section 400 also calculates the dead time compensation amount corresponding to the inverter-applying voltage VR and changes it. The inverter-applying voltage sensitive-compensation amount calculating section 410 is the similar configuration shown in FIG. 13. The inverter-applying voltage VR is limited the positive and negative maximum values at an input limiting section (corresponding to the input limiting section 221 in FIG. 13), and the inverter-applying voltage (corresponding to the voltage VR1) of which the maximum values are limited is inputted into an inverter-applying voltage/dead time compensation-amount converting table (corresponding to the inverter-applying voltage/dead time compensation-gain converting table 222). The characteristic of the inverter-applying voltage/dead time compensation-amount converting table is shown, for example, in FIG. 18. That is, the dead time compensation amount DTC is a constant dead time compensation amount DTC1 till a predetermined inverter-applying voltage VR1, linearly (non-linearly) increases from the predetermined inverter-applying voltage current VR1 to a predetermined inverter-applying voltage VR2 (>VR1), and holds a constant dead time compensation amount DTC2 more than the predetermined inverter-applying voltage VR2.

Figure 19:
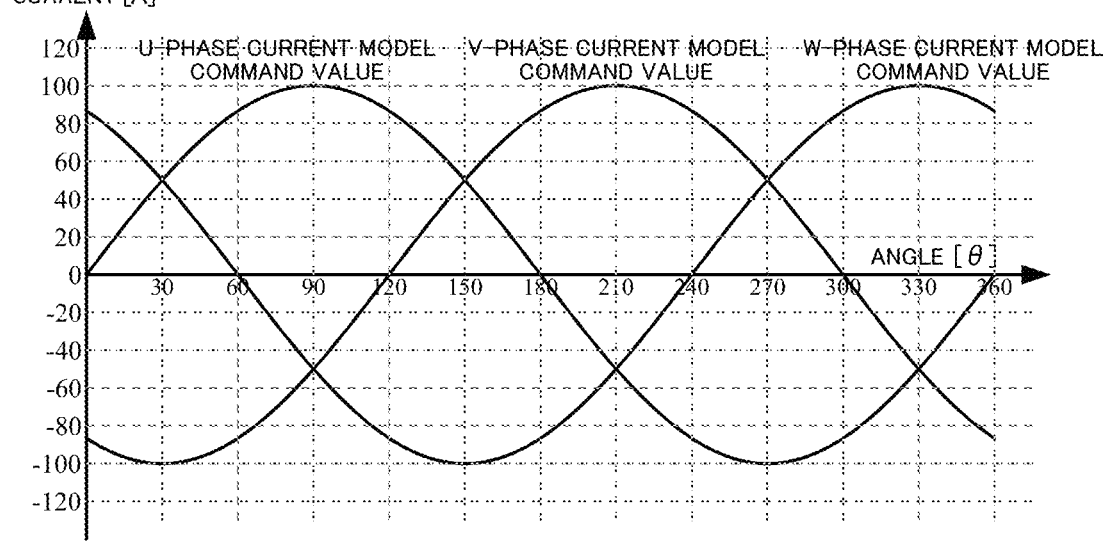
FIG. 19 is a waveform chart showing a characteristic example of an output waveform of a 3-phase current command model.
Figure 20:
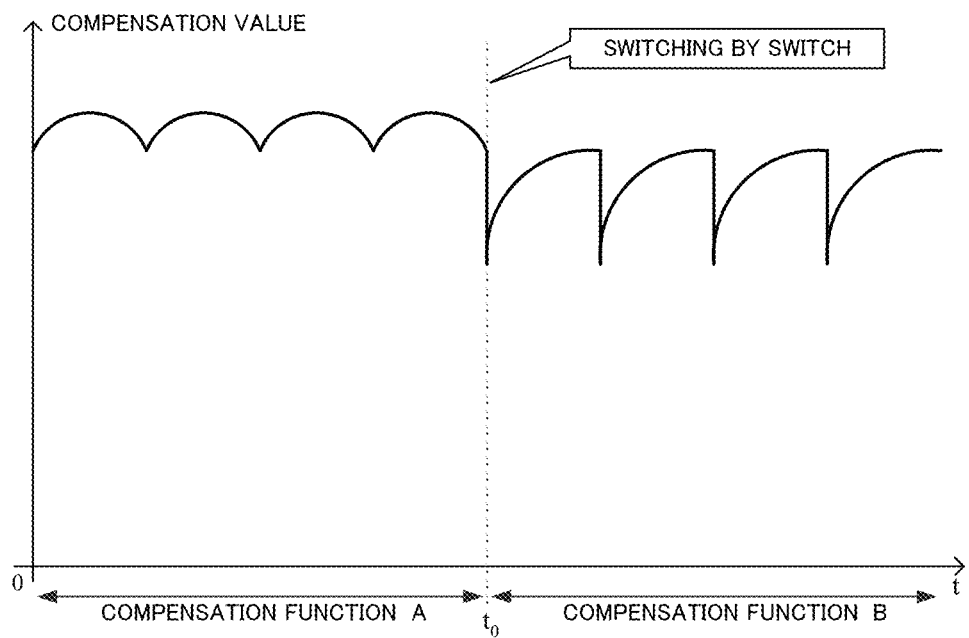
FIG. 20 is a waveform chart showing an example of an output waveform of the dead time switching by a condition a condition branch.

The d-axis current command value id* and the q-axis current command value iq* are inputted into the 3-phase current command value model 420 with the motor rotational angle θm. The 3-phase current command value model 420 obtains sine wave 3-phase current model command values Icm, by a calculation or a table from the dq-axes current command values id* and iq* and the motor rotational angle θm, of which phases are respectively shifted by 120 [deg] as shown in FIG. 19 (refer to the below Equations 2 and 3). The 3-phase current model command values Icm are different depending on the motor types. When the d-axis current command value iref_d and the q-axis current command value iref_q are converted from the motor electric angle θe into the 3-phase current command values (the U-phase, the V-phase and the W-phase), the below Equation 2 is established.

$$\begin{bmatrix} i_{ref\_u} \\ i_{ref\_v} \\ i_{ref\_w} \end{bmatrix} = \begin{bmatrix} \cos(\theta_e) & \sin(\theta_e) \\ \cos\left(\theta_e - \frac{2}{3}\pi\right) & \sin\left(\theta_e - \frac{2}{3}\pi\right) \\ \cos\left(\theta_e + \frac{2}{3}\pi\right) & \sin\left(\theta_e + \frac{2}{3}\pi\right) \end{bmatrix} \begin{bmatrix} i_{ref\_d} \\ i_{ref\_q} \end{bmatrix}$$ [Equation 2]

By obtaining the 3-phase current command values from the Equation 2, the U-phase current command value model iref_u, the V-phase current command value model iref_v and the W-phase current command value model iref_w are respectively represented by the below Equation 3.

$i_{ref\_u} = i_{ref\_d} \cdot \cos(\theta_e) + i_{ref\_q} \cdot \sin(\theta_e)$ $i_{ref\_v} = i_{ref\_d} \cdot \cos(\theta_e - 2/3\pi) + i_{ref\_q} \cdot \sin(\theta_e - 2/3\pi)$ $i_{ref\_w} = i_{ref\_d} \cdot \cos(\theta_e + 2/3\pi) + i_{ref\_q} \cdot \sin(\theta_e + 2/3\pi)$ [Equation 3]

The table may be a type stored in an electrically erasable and programmable read-only memory (EEPROM) or a type expanded on a random access memory (RAM). In the use of the Equation 3, it may obtain another sine-function term such that only sine θ is tabulated and cos θ is calculated by using the 90° offset of the input θ or by offsetting the input θ by 120°. In a case that there is no problem in the ROM capacity or the command value model is complicated (e.g. a pseudo rectangular wave motor and so on), the whole equations are in advance tabulated.

The 3-phase current model command values Icm are inputted into the phase-current compensation-sign estimating section 421. The phase-current compensation-sign estimating section 421 outputs compensation signs SN of positive (+1) or negative (−1) with hysteresis characteristics shown in FIGS. 12A and 12B for the 3-phase current model command values Icm. Although the compensation signs SN are estimated as reference being points that the 3-phase current model command values Icm respectively cross zero, the hysteresis characteristics are set for suppressing the chattering. The estimated compensation signs SN are inputted into the multiplying section 402. As well, the positive and negative thresholds of the hysteresis characteristics are appropriately changeable.

In a case that the sign of the dead time compensation value is simply determined from the current sign of the phase current command value model, the chattering occurs at the low load state. For example, when the steering wheel is rightly turned right or left on the on-center, the torque ripple occurs. In order to improve the problem, the hysteresis characteristics (in FIG. 12, ±0.25 [A]) is assigned to the sign judgment, and the present sign is held so as to suppress the chattering except for the case when the current exceeds the set current value and the sign is changed.

The dead time compensation amount DTC from the inverter-applying voltage sensitive-compensation amount calculating section 410 is inputted into the multiplying section 402, and the multiplying section 402 outputs the dead time compensation amount DTCa (=DTC×SN) multiplied with the compensation sign SN. The dead time compensation amount DTCa is inputted into the 3-phase AC/dq-axes converting section 440, and the 3-phase AC/dq-axes converting section 440 outputs the dead time compensation values vd* and vq* of the two phases in synchronization with the motor rotational angle θm. The dead time compensation values vd* and vq* are respectively added with the voltage command values vd and vq at the adding sections 121d and 121q, and the dead time compensation of the inverter 161 is performed.

As stated above, in the present invention, the dead time compensation values of the inverter are switched by the dead time compensating function (A) based on the motor rotational angel (the electric angle) and the dead time compensating function (B) based on the current command value model with the predetermined condition and are fed-back to the voltage command values on the dq-axes with the feed-forward so as to compensate the dead time of the inverter. Consequently, it is possible to perform the most suitable dead time compensation by simultaneously switching the differential compensating functions A and B.

Figure 21:
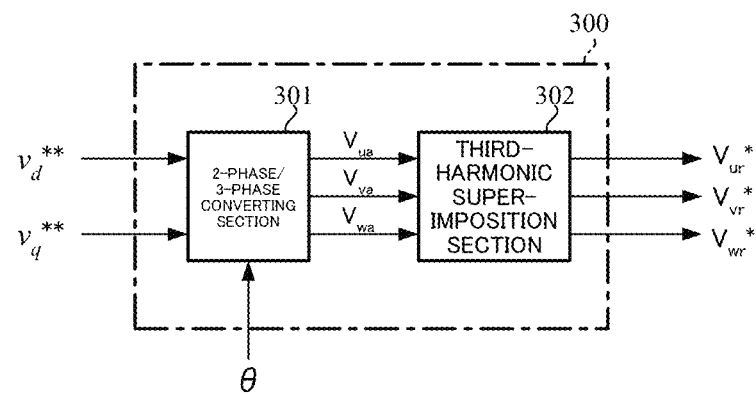
FIG. 21 is a block diagram showing a configuration example of a spatial vector modulating section.

Next, the spatial vector modulation will be described. The spatial vector modulating section 300 may have a function that converts 2-phase voltages (vd, Vq) on the dq-axes space into 3-phase voltages (Vua, Vva, Vwa) and a third harmonic waveform to the 3-phase voltages (Vua, Vva, Vwa) as shown in FIG. 21. For example, the spatial vector modulating methods proposed in Japanese Publication Unexamined Patent No. 2017-70066, WO/2017/098840 (Japanese Patent Application No. 2015-239898) and so on by the present applicant may be used.

Figure 22:
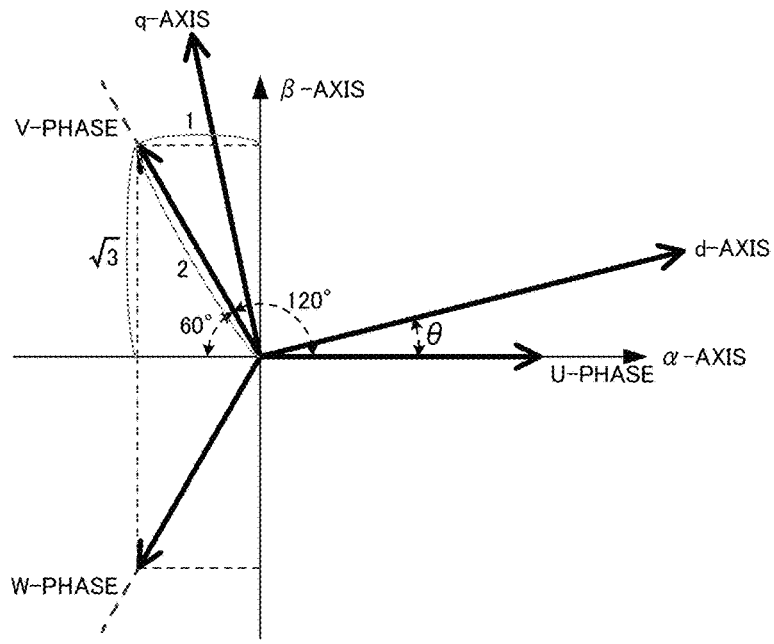
FIG. 22 is a diagram showing an operation example of the spatial vector modulating section.

That is, the spatial vector modulation performs the below coordinate transformation based on the voltage command values vd and vq of the dq-axes space, the motor rotational angle θ and a sector number n (#1 to #6), and controls ON/OFF of the FETs (upper-arm Q1, Q3, Q5; lower-arm Q2, Q4, Q6) of the bridge type inverter. By supplying switching patterns S1 to S6 corresponding to the sectors #1 to #6 to the motor, it has a function to control the rotation of the motor. Regarding the coordinate transformation, in the spatial vector modulation, the voltage command values vd and vq are coordinate-transformed to voltage vectors Vα and Vβ on an α-β coordinate system based on the below Equation 4. A relation between the coordinate axis and the motor rotational angle θ used in the above coordinate transformation, is shown in FIG. 22.

$$\begin{bmatrix} V\alpha \\ V\beta \end{bmatrix} = \begin{bmatrix} \cos\theta & -\sin\theta \\ \sin\theta & \cos\theta \end{bmatrix} \begin{bmatrix} v_d^{} \\ v_q^{} \end{bmatrix}$$ [Equation 4]

There is a relation expressed by the below equation 5 between the target voltage vector on the d-q coordinate system and the a target voltage vector on the α-β coordinate system, and an absolute value of the target voltage vector V is held.

$$|V|=\sqrt{(v_d^{})^2+(v_q^{})^2}=\sqrt{V\alpha^2+V\beta^2} \quad \text{[Equation 5]}$$

Figure 23:
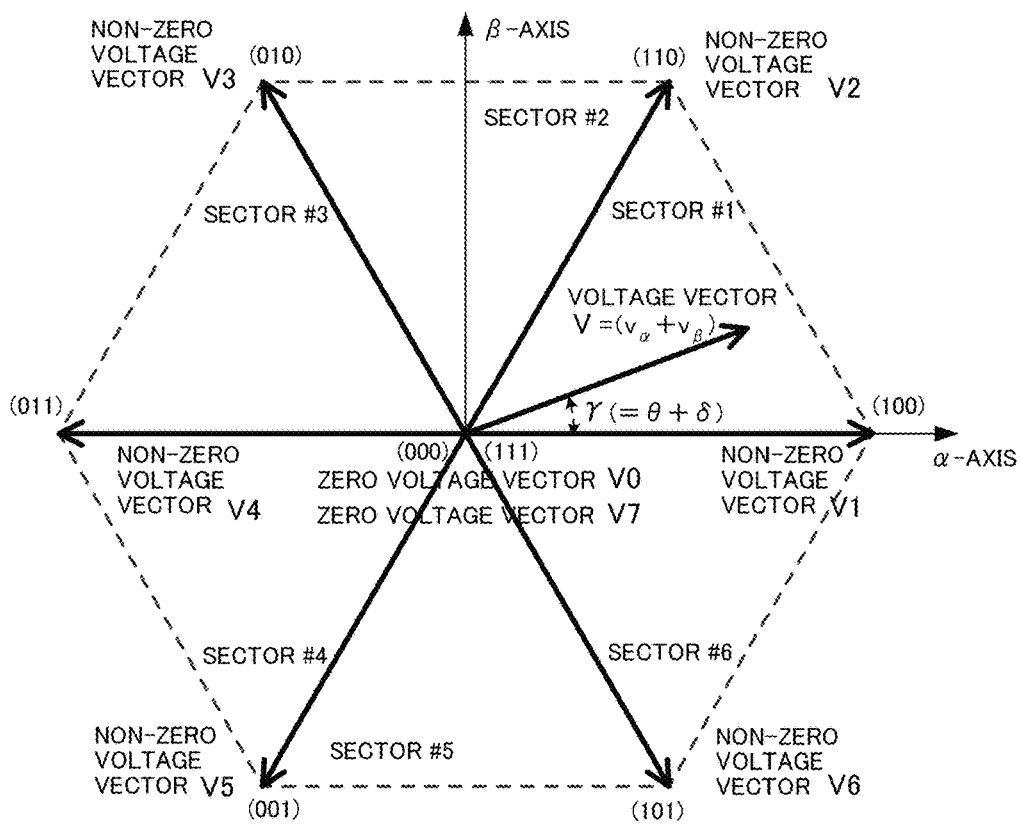
FIG. 23 is a diagram showing an operation example of the spatial vector modulating section.

In the switching patterns of the spatial vector control, the output voltages of the inverter are defined with 8-kinds discrete reference output voltage vectors V0 to V7 (non-zero voltage vectors V1 to V6 of which phases are different by π/3 [rad] and zero voltage vectors V0, V7) shown in the spatial vector diagram of FIG. 23 corresponding to the switching patterns S1 to S6 of the FETs (Q1 to Q6). The selection of the reference output voltage vectors V0 to V7 and the occurrence time thereof are controlled. It is possible to divide the spatial vectors into the six sectors #1 to #6 by using six regions sandwiched with adjacent reference output voltage vectors. The target voltage vector belongs to any one of the sectors #1 to #6, and it is possible to allot the sector number. It is possible to obtain based on the rotational angle Y in the α-β coordinate system of the target voltage vector V that the target voltage vector V being the synthetic vector of Vα and Vβ exists any one of the sectors shown in FIG. 23 sectioned to the regular hexagonal shape in the α-β space. The rotational angle Y is determined by "Y=θ+δ" as an addition of the phase δ obtained from a relation between the motor rotational angle θ and the voltage command values vd and vq in the d-q coordinate system.

Figure 24:
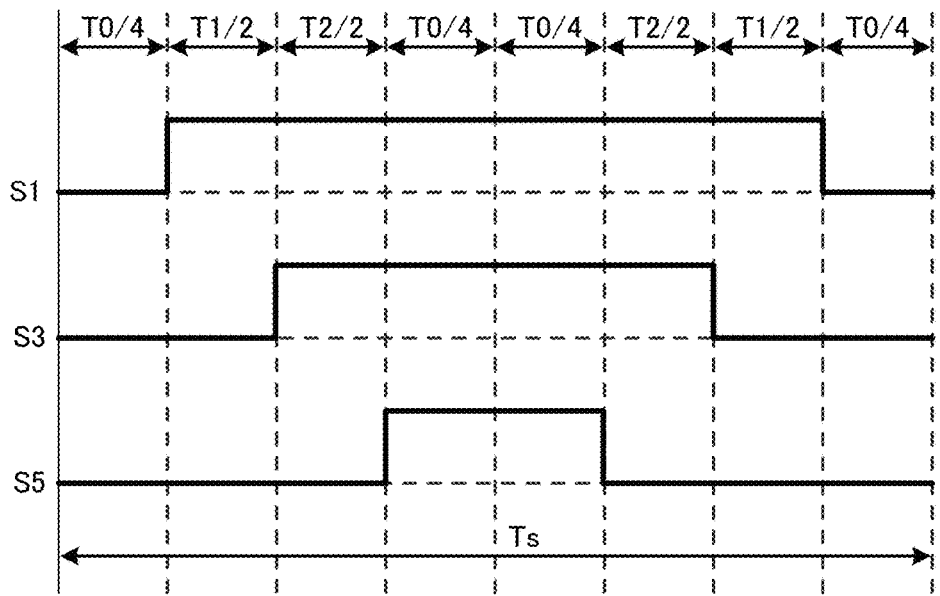
FIG. 24 is a timing chart showing an operation example of the spatial vector modulating section.

FIG. 24 shows a basic timing chart to determine, with the digital control due to the switching patterns S1, S3, S5 of the inverter in the spatial vector control, the switching pulse width and the timing in ON/OFF signals S1 to S6 (switching patterns) for the FETs in order to output the target voltage vector V from the inverter. The spatial vector modulation performs the calculation and the like at a every prescribed sampling term Ts within the sampling term Ts, and converts the calculated result into the respective switching pulse widths and the timings of the switching patterns S1 to S6 at a next sampling term Ts and then outputs.

The spatial vector modulation generates the switching patterns S1 to S6 corresponding to the sector numbers obtained based on the target voltage vector V. In FIG. 24, an example of the switching patterns S1 to S6 of the FETs of the inverter in a case of the sector number #1 (n=1) is shown. The signals S1, S3, S5 indicate gate signals of the FETs Q1, Q3, Q5 corresponding to the upper-arm. The horizontal axis is a time, and "Ts" corresponds to a switching period and is divided into 8-periods comprising T0/4, T1/2, T2/2, T0/4, T0/4, T2/2, T1/2 and T0/4. The terms T1 and T2 are respectively times depending on the sector number n and rotational angel Y.

Figure 25:
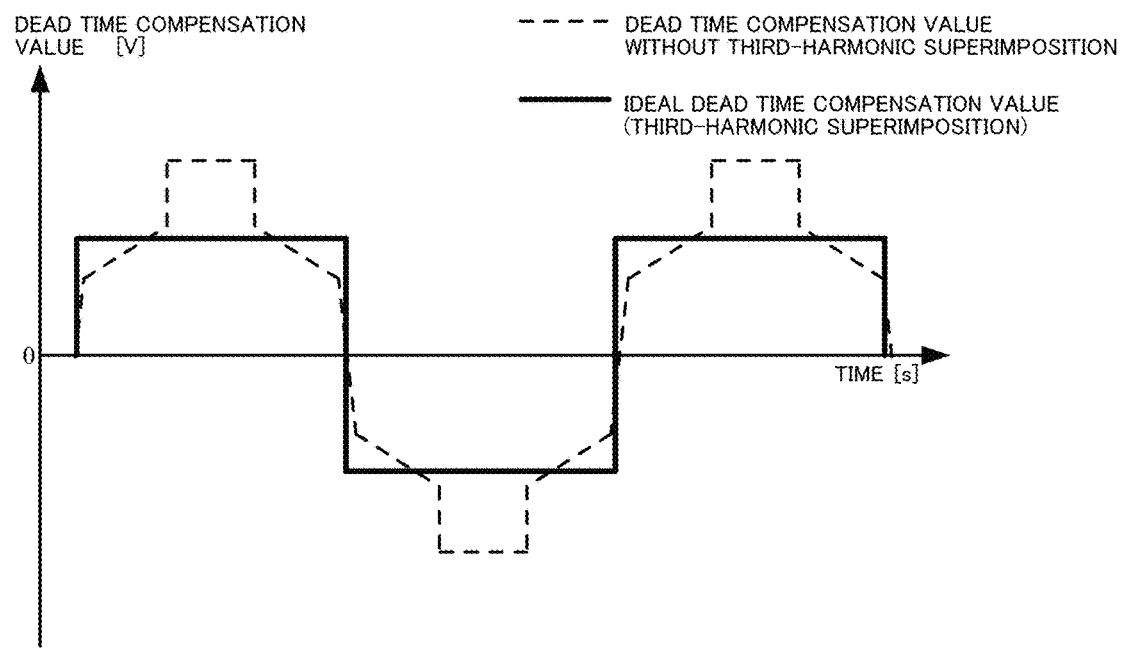
FIG. 25 is a waveform chart showing an effect of the spatial vector modulating section.

In a case that there is no the spatial vector modulation, the dead time compensation value waveform (the U-phase waveform) that dead time compensation of the present invention is applied on the dq-axes and only the dead time compensation values are dq-axes/3-phase-converted, is a waveform removed the third harmonic component as shown by a dashed-line in FIG. 25. The V-phase and the W-phase are also same. By adopting the spatial vector modulation instead of the dq-axes/3-phase conversion, it is possible to superpose the third harmonic wave to 3-phase signals and further to make up for the third harmonic component being wanting due to the 3-phase conversion. Thereby, it is possible to generate the ideal dead time compensation waveform as shown by a real line of FIG. 25.

Figure 26:
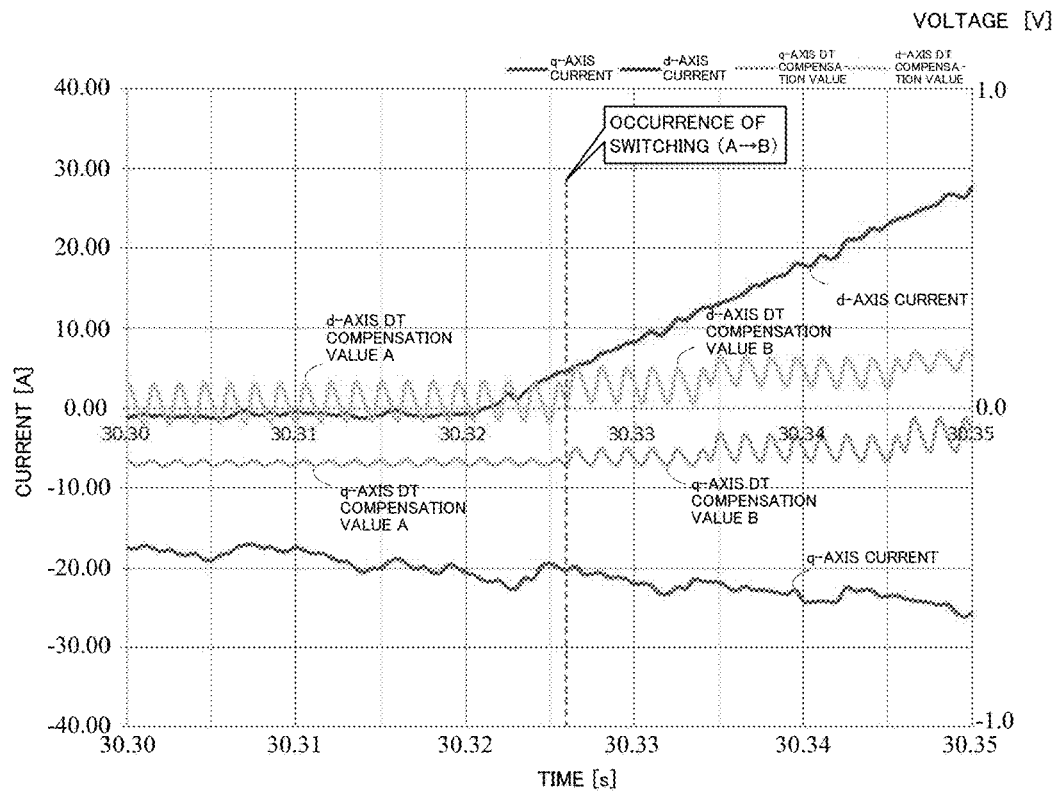
FIG. 26 is a waveform chart showing an effect of the present invention.

FIG. 26 is an experimental result by using a steering test apparatus, and indicates the waveforms of the d-axis current and the q-axis current, the d-axis dead time compensation value and the q-axis dead time compensation value when the steering is switched from the compensating function A to the compensating function B in the steering state that the steer-forward is performed from the while speed to the high speed. As shown in FIG. 26, by adopting the dead time compensation of the present invention and switching the dead time function value from A to B, it is possible to confirm that there is no wave distortion of the dq-axes currents due to the influence of the dead time even the current control characteristic is changed at the beginning of the d-axis current flowing.

Figure 27:
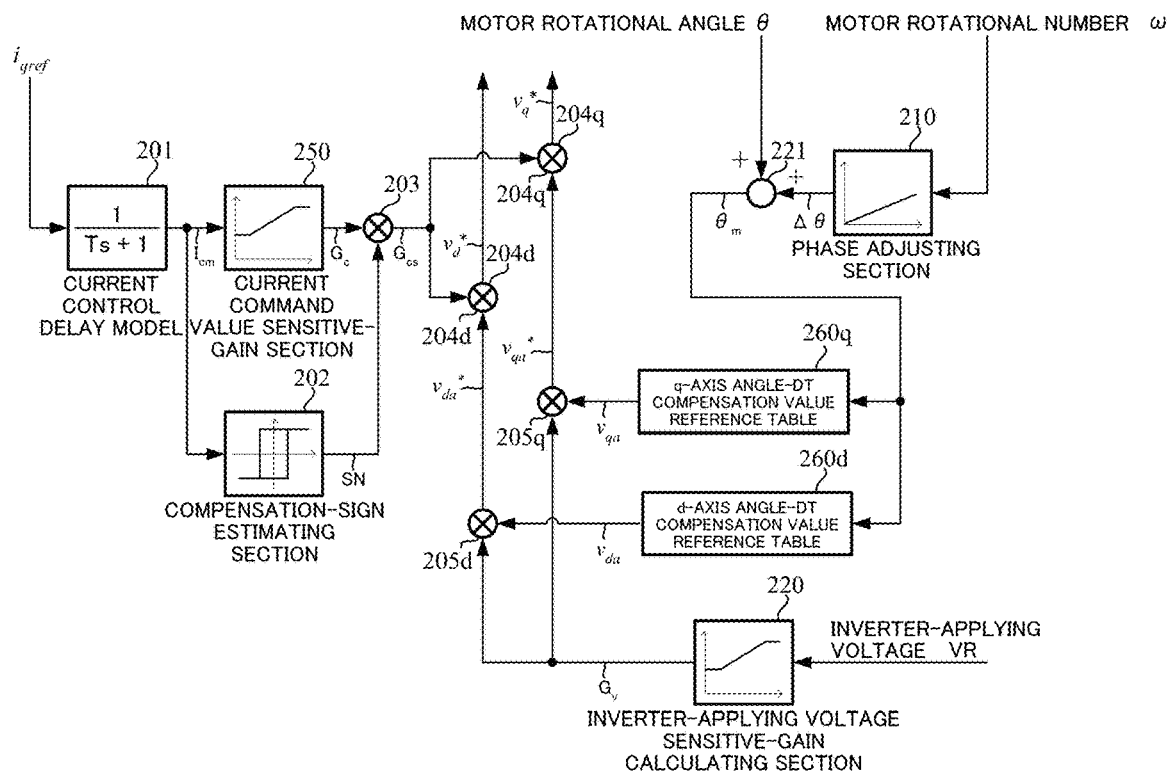
FIG. 27 is a block diagram showing an another configuration example of the dead time compensating section (A)
Figure 28:
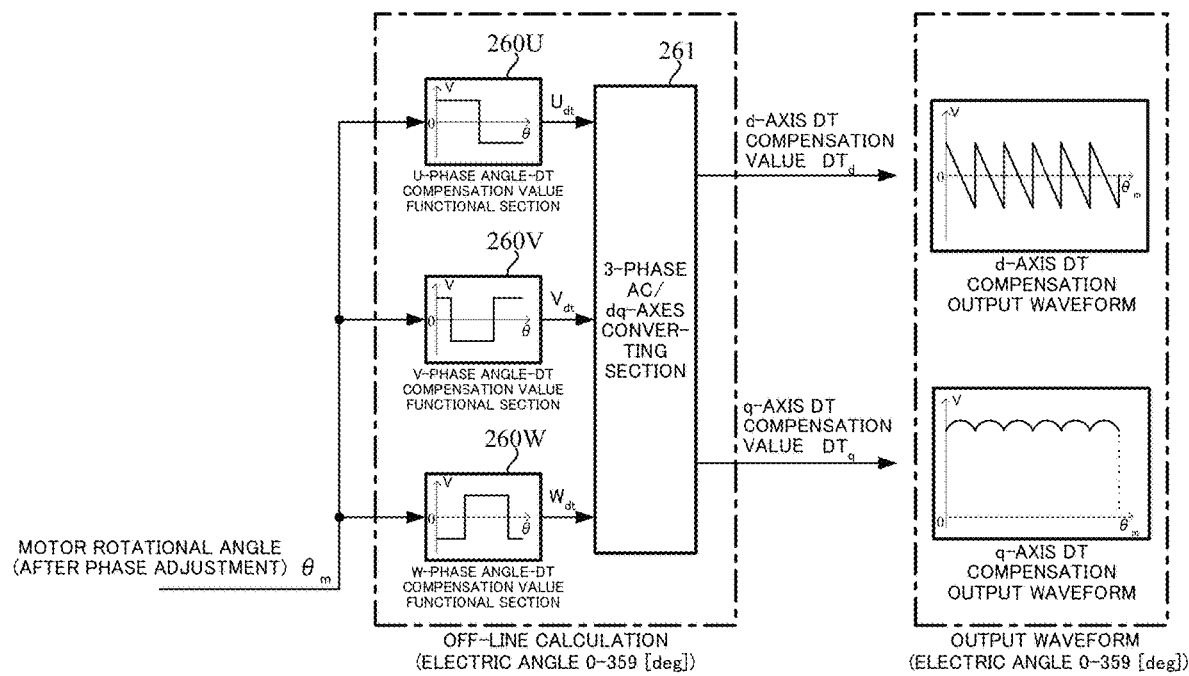
FIG. 28 is a diagram showing an operation example of a respective phase-angles-dead time compensation-value function section.

FIG. 27 shows an another example of the dead time compensating section (A) 200 corresponding to FIG. 7, and the reference tables 260d and 260q directly calculate the dead time compensation values vda and vqa of the dq-axes. The details of the dq-axes angle-dead time compensation value reference tables 260d and 260q are shown in FIG. 28, and the dead time compensation values being angle necessary for the three phases are calculated on off-line and are converted into the dead time compensation values of the dq-axes. That is, the respective angle-dead time compensation value functional sections 260U, 260V and 260W output respective phase dead time reference compensation values Udt, Vdt and Wdt of rectangular wave of which phases are respectively shifted by 120 [deg] in a range of the electric angle 0 to 359 [deg] for the motor rotational angel θm of which phase is adjusted. The angle-dead time compensation value functional sections 230U, 230V and 230W obtain the dead time compensation values needed in the three phases as the functions due to angle by the off-line, and output the dead time reference compensation values Udt, Vdt and Wdt. The angle functions of the dead time reference compensation values are different depending on the characteristic of the dead time of the ECU.

Figure 29A:
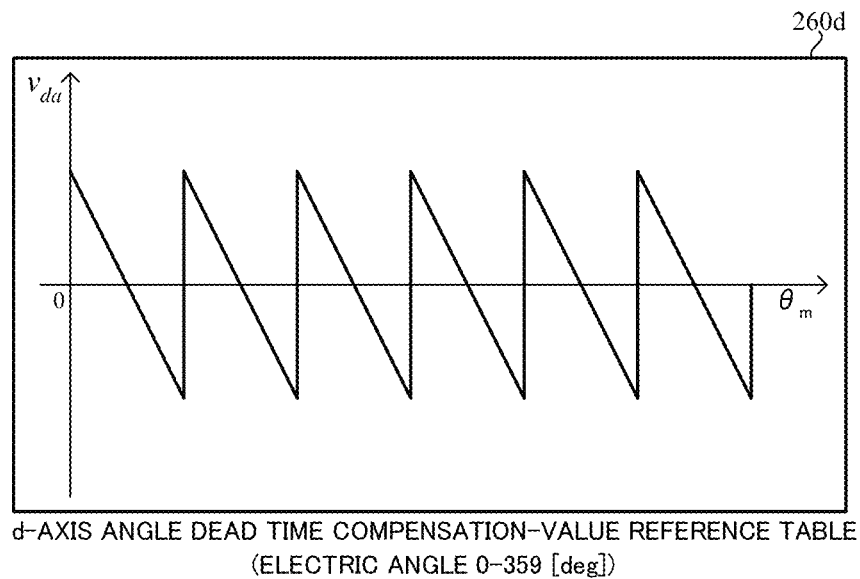
FIGS. 29A and 29B are characteristic diagrams showing an output voltage characteristic of a dq-axes angle-dead time compensation-value reference table.
Figure 29B:
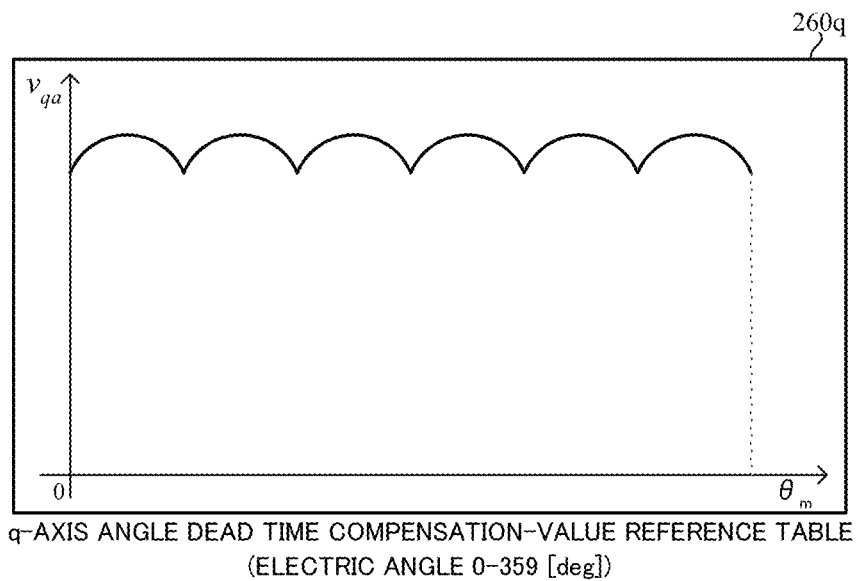

The dead time reference compensation values Udt, Vdt and Wdt are inputted into the 3-phase AC/dq-axes converting section 261, and is converted into the dq-axes dead time compensation values DTd and DTq of the waveform as shown in FIG. 28. Based on the dq-axes output waveforms of FIG. 28, the dq-axes angle-dead time compensation value reference tables 260d and 260q are generated by the angle (θm) input. The angle-dead time compensation value reference tables 260d has an output voltage characteristic of sawtooth wave for the motor rotational angel Gm as shown in FIG. 29A, and the angle-dead time compensation value reference tables 260q has an output voltage characteristic of waveform overlapped the offset voltage as shown in FIG. 29B.

The output voltages vda and vqa indicating the dead time compensation values vda* and vqa* from the dq-axes angle-dead time compensation value reference tables 260d and 260q are respectively inputted into the multiplying sections 205d and 205q, and are multiplied with the voltage sensitive gain Gv. The dq-axes dead time compensation values vda* and vqa* multiplied the voltage sensitive gain Gv at the multiplying sections 205d and 205q are respectively inputted into the multiplying sections 204d and 204q, and are multiplied with the current command sensitive gain Gcs. The multiplied results at the multiplying sections 204d and 204q are the dead time compensation values vd* and vq*, and the dead time compensation values vd* and vq* are respectively added to the voltage command values Vd and vq at the adding section 121d and 121q.

EXPLANATION OF REFERENCE NUMERALS 1 handle (steering wheel)
2 column shaft (steering shaft, handle shaft)
10 torque sensor
12 vehicle speed sensor 20, 100, motor
30 control unit (ECU)
31 steering assist command value calculating section
35,203, 204 PI-control section
36, 160 PWM-control section
37, 161 inverter
110 angle detecting section
130 3-phase AC/dq-axes converting section
140 d-q non-interference control section
200 dead time compensating section (A)
201 current control delay model
202 compensation-sign estimating section
210, 430 phase adjusting section
220 inverter-applying voltage sensitive-gain section
230U, 230V, 230W angle-dead time compensation angle functional section
240, 440 3-phase AC/dq-axes converting section
250 current command value sensitive-gain section
300 spatial vector modulating section
301 2-phase/3-phase converting section
302 third harmonic wave superposition section
400 dead time compensating section (B)
420 3-phase current command value model
421 phase-current compensation-sign estimating section
500 compensation value switching section
501, 502 condition branching section
510 switch judging section

The invention claimed is:

1. An electric power steering apparatus of a vector control system that calculates steering assist command values of dq axes based on at least a steering torque, calculates dq-axes current command values from said steering assist command values, converts said dq-axes current command values into 3-phase duty command values, driving-controls a 3-phase brushless motor by an inverter of a pulse width modulation (PWM) control, and applies an assist torque to a steering system of a vehicle,
wherein said electric power steering apparatus has plural dead time compensating functions of which efficiencies to respectively perform a dead time compensation of said inverter are different from each other, and performs said dead time compensation by switching from one of said plural dead time compensating functions to another of said dead time compensating functions with a predetermined condition.

2. The electric power steering apparatus according to claim 1, wherein said plural dead time compensating functions are two, and a first function is a dead time compensating function A, which has an effect in a low speed steering maneuver and a while speed steering maneuver, of said inverter based on functions of a motor rotational angle and a second function is a dead time compensating function B, which has an effect in a high speed steering maneuver, of said inverter based on a current command value model.

3. The electric power steering apparatus according to claim 1, where said predetermined condition is a switch condition defined by said dq-axes current command values and a motor rotational number.

4. The electric power steering apparatus according to claim 3, where a switch of said dead time compensating function A and said dead time compensating function B is performed by a condition branch of software based on said switch condition.

5. An electric power steering apparatus of a vector control system that calculates steering assist command values of dq axes based on at least a steering torque, calculates dq-axes current command values from said steering assist command values, converts said dq-axes current command values into 3-phase duty command values, driving-controls a 3-phase brushless motor by an inverter of a pulse width modulation (PWM) control, and applies an assist torque to a steering system of a vehicle, comprising:
a dead time compensating section A that calculates first dq-axes compensation values relating to said dq-axes of said inverter based on a motor rotational angle of said 3-phase brushless motor;
a dead time compensating section B that inputs said dq-axes current command values, and calculates second dq-axes compensation values relating to said dq-axes of said inverter based on a current command value model; and
a compensation value switching section that outputs dq-axes dead time compensation values by switching said first dq-axes compensation values and said second dq-axes compensation values based on said dq-axes current command values and said steering assist current command value of said q-axis,
wherein a dead time compensation of said inverter is performed by a correction of said dq-axes current command values with said dq-axes dead time compensation values.

6. The electric power steering apparatus according to claim 5, wherein said compensation value switching section comprising:
a switch judging section to judge a compensation value switch based on said dq-axes current command values and said steering assist current command value of said q-axis; and
a condition branching section to output said first dq-axes compensation values or said second dq-axes compensation values serving as said dq-axes dead time compensation values by using a switch judgment flag from said switch judging section.

7. The electric power steering apparatus according to claim 6, wherein said switch judging section comprising:
a zero judging section to output a first judgment flag when said d-axis current command value is zero or vicinity;
a first absolute value section to obtain an absolute value of said q-axis current command value;
a first threshold section having a first hysteresis characteristic and outputting a second judgment flag when an output of said first absolute value section is equal to or more than a first threshold value;
a second absolute value section to obtain an absolute value of a motor rotational number;
a second threshold section having a second hysteresis characteristic and outputting a third judgment flag when an output of said second absolute value section is equal to or more than a second threshold value; and
a switch condition judging section to output said switch judgment flag when said first judgment flag, said second judgment flag and said third judgment flag are inputted.

8. The electric power steering apparatus according to claim 7, wherein said zero or vicinity is "0.0-0.1 [A]".

9. The electric power steering apparatus according to claim 6, wherein said condition branching section performs a condition branch of software based on said switch judgment flag.

10. The electric power steering apparatus according to claim 5, wherein said correction is performed by an adding calculation of said dq-axes dead time compensation values and said dq-axes current command values.

11. The electric power steering apparatus according to claim 6, wherein said correction is performed by an adding calculation of said dq-axes dead time compensation values and said dq-axes current command values.

\* \* \* \* \*